United States Patent
He et al.

(10) Patent No.: US 12,333,784 B2
(45) Date of Patent: Jun. 17, 2025

(54) TRAJECTORY PREDICTION METHOD AND DEVICE

(71) Applicant: Beijing Tusen Weilai Technology Co., Ltd., Beijing (CN)

(72) Inventors: Hao He, Beijing (CN); Naiyan Wang, Beijing (CN)

(73) Assignee: BEIJING TUSEN WEILAI TECHNOLOGY CO., LTD., Beijing (CN)

( * ) Notice: Subject to any disclaimer, the term of this patent is extended or adjusted under 35 U.S.C. 154(b) by 1015 days.

(21) Appl. No.: 17/369,787

(22) Filed: Jul. 7, 2021

(65) Prior Publication Data
US 2022/0011122 A1 Jan. 13, 2022

(30) Foreign Application Priority Data

Jul. 9, 2020 (CN) .......................... 202010658245.9

(51) Int. Cl.
*G06V 10/764* (2022.01)
*G01C 21/34* (2006.01)
(Continued)

(52) U.S. Cl.
CPC ....... *G06V 10/764* (2022.01); *G01C 21/3407* (2013.01); *G01C 21/3453* (2013.01);
(Continued)

(58) Field of Classification Search
CPC ....... G06N 3/044; G06V 20/56; B60W 30/14; G01C 21/3617; G01C 21/00; G01S 17/936; G08G 1/123; G06Q 10/04
See application file for complete search history.

(56) References Cited

U.S. PATENT DOCUMENTS

2018/0120843 A1* 5/2018 Berntorp ................ G06V 20/56

FOREIGN PATENT DOCUMENTS

| CN | 108629978 A | * 10/2018 | ............. G06Q 10/04 |
| CN | 109716361 A | 5/2019 | |

(Continued)

OTHER PUBLICATIONS

European Patent Office, Communication pursuant to Article 94(3) EPC for EP Appl. No. 21184239.8, 7 pages.
Chinese Patent Office, First Office Action for CN Appl. No. 202010658245.9, mailed on Jun. 28, 2024, 10 pages with English translation.

(Continued)

*Primary Examiner* — Yuri Kan
(74) *Attorney, Agent, or Firm* — Perkins Coie LLP

(57) ABSTRACT

Provided are a trajectory prediction method and device, a storage medium, and a computer program to avoid low accuracy and low reliability of a prediction result in conventional trajectory prediction methods. A trajectory prediction neural network acquires input current trajectory data and current map data of current environment when a moving subject moves in the current environment. The current trajectory data and the current map data are expressed as a current trajectory point set and a current map point set in a high-dimensional space. A global scene feature is extracted according to the current trajectory point set and the current map point set. The global scene feature has a trajectory feature and a map feature of the current environment. Multiple prediction trajectory point sets of the moving subject and a probability corresponding to each prediction trajectory point set are predicted and output according to the global scene feature.

18 Claims, 17 Drawing Sheets

(51) Int. Cl.
*G06N 3/044* (2023.01)
*G06N 3/0455* (2023.01)
*G06V 10/82* (2022.01)
*G06V 20/56* (2022.01)

(52) U.S. Cl.
CPC ............ *G06N 3/044* (2023.01); *G06N 3/0455* (2023.01); *G06V 10/82* (2022.01); *G06V 20/56* (2022.01)

(56) References Cited

FOREIGN PATENT DOCUMENTS

| CN | 109754630 | A | * | 5/2019 | ............. G08G 1/123 |
| CN | 110221603 | A | * | 9/2019 | ........... G01S 17/936 |
| CN | 110275531 | A |   | 9/2019 | |
| CN | 111242351 | A |   | 6/2020 | |
| JP | 2004157049 | A | * | 6/2004 | ............. G01C 21/00 |
| WO | WO-2007119559 | A1 | * | 10/2007 | ......... G01C 21/3617 |
| WO | WO-2020001871 | A1 | * | 1/2020 | ............. B60W 30/14 |

OTHER PUBLICATIONS

Liu, Chuang et al., "Vehicle Motion trajectory prediction based on attention mechanism," Journal of Zhejiang University (Engineering Science), vol. 54, No. 6, Jun. 2020, Hangzhou, China, 8 pages.
Sagrebin-Mitzel, M., European Application No. 21184239.8, Extended European Search Report Mailed Dec. 6, 2021, pp. 1-8.
Hayoung, Kim, et al. "Multi-Head Attention based Probabilistic Vehicle Trajectory Prediction", ARXIV.org, Cornell University Library, 201 OLIN Library Cornell University Ithaca, NY 14853, Jul. 4, 2020, pp. 1-6.
He, Hao et al. "UST: Unifying Spatial-Temporal Context for Trajectory Prediction in Autonomous Driving", ARXIV.org, Cornell University Library, 201 OLIN Library Cornell University Ithaca, NY 14853, May 6, 2020, pp. 1-8.
Resink, Tim et al. "Vehicle motion prediction for autonomous driving: A deep learning model based on vehicle interaction and road geometry using a semantic map," A thesis. Feb. 28, 2019, pp. 1-84. Retrieved from the internet: https://repository.tudelft.nl/islandora/object/uuid%3Abb469461-b879-40fd-abbc-1a6e0233bf1b (retrieved on Nov. 18, 2021.

* cited by examiner

TRAJECTORY PREDICTION METHOD AND DEVICE

CROSS-REFERENCE TO RELATED APPLICATION

The present disclosure claims priority to Chinese Patent Application No. 202010658245.9, titled "TRAJECTORY PREDICTION METHOD AND DEVICE", filed on Jul. 9, 2020, the content of which is incorporated herein by reference in its entirety.

TECHNICAL FIELD

The present application relates to the field of computer technologies, in particular, a trajectory prediction method and device, a storage medium, and a computer program.

BACKGROUND

Based on the research and development of artificial intelligence, many technical fields combined with artificial intelligence have been widely used and developed, such as robotics and autonomous driving technology.

In the field of robotics and autonomous driving, an important link is trajectory prediction. The trajectory prediction largely determines the safety performance of an autonomous driving system. Taking the autonomous driving as an example, in a process of vehicle driving, it is necessary to use trajectory prediction technology to predict driving the trajectory of surrounding vehicles in a period of time in the future in real time so that the autonomous driving system can make safe path planning based on a prediction result and thus collisions are avoided.

SUMMARY

Embodiments of the present application provide a trajectory prediction method and device, a storage medium, and a computer program so that the problem of low accuracy and low reliability of a prediction result in a trajectory prediction method in the existing art can be solved.

According to one aspect of embodiments of the present application, a trajectory prediction method is provided. The method includes acquiring, by a trajectory prediction neural network, input current trajectory data and current map data of a current environment in a process of a moving subject performing movement in the current environment, where the current trajectory data includes multiple trajectory points of the moving subject and one or more other moving objects in the current environment in a past predetermined time period, each trajectory point includes a spatial position at a corresponding time point, and the current map data includes spatial positions of multiple map points of road elements in the current environment in the predetermined time period.

The current trajectory data and the current map data are expressed as a current trajectory point set and a current map point set in a high-dimensional space, where the current trajectory point set includes high-dimensional trajectory points to which trajectory points in the current trajectory data each correspond, and the current map point set includes high-dimensional map points to which map points in the current map data each correspond.

A global scene feature is extracted according to the current trajectory point set and the current map point set, where the global scene feature has a trajectory feature and a map feature of the current environment.

Multiple prediction trajectory point sets of the moving subject and a probability corresponding to each prediction trajectory point set are predicted and output according to the global scene feature, where each prediction trajectory point set includes spatial positions of the moving subject at multiple time points in a future predetermined time period.

According to another aspect of embodiments of the present application, a trajectory prediction device is provided. The device includes an encoder and a decoder.

The encoder is configured to acquire input current trajectory data and current map data of a current environment in a process of a moving subject performing movement in the current environment, where the current trajectory data includes multiple trajectory points of the moving subject and one or more other moving objects in the current environment in a past predetermined time period, each of the multiple trajectory points includes a spatial position at a corresponding time point, and the current map data includes spatial positions of multiple map points of road elements in the current environment in the predetermined time period.

The encoder is configured to express the current trajectory data and the current map data as a current trajectory point set and a current map point set in a high-dimensional space.

The encoder is further configured to extract a global scene feature according to the current trajectory point set and the current map point set, where the global scene feature has a map feature and a trajectory feature of the current environment.

The decoder is configured to predict and output multiple prediction trajectory point sets of the moving subject and a probability corresponding to each of the multiple prediction trajectory point sets according to the global scene feature, where each of the multiple prediction trajectory point sets includes spatial positions of the moving subject at multiple time points in a future predetermined time period.

According to another aspect of embodiments of the present application, a trajectory prediction device is provided. The trajectory prediction device includes at least one processor and at least one memory, where at least one machine-executable instruction is stored in the at least one memory, and the at least one processor executes the at least one machine-executable instruction to implement the preceding trajectory prediction method.

According to another aspect of embodiments of the present application, a computer program is provided, where the computer program has code segments configured to perform following trajectory prediction processing, and the processing includes the preceding trajectory prediction method.

According to another aspect of embodiments of the present application, a non-transitory storage medium is provided, where the non-transitory storage medium is configured to store a computer program used for trajectory prediction processing, and the processing includes the preceding trajectory prediction method.

According to the trajectory prediction method provided in embodiments of the present application, the current trajectory data and the current map data acquired in real time can be expressed as the current trajectory point set and the current map point set in the high-dimensional space in a real-time process of the moving subject performing movement. The global scene feature can be obtained according to the current trajectory point set and the current map point set, where the global scene feature has the trajectory feature and the map feature of the current environment. The trajectory of the moving subject in the future predetermined time period can be predicted according to the global scene feature. The current trajectory data and the current map data are expressed as a data point set in the high-dimensional space, and the data point set with both a temporal feature and a spatial feature can be obtained. The global scene feature integrates the map feature with the trajectory feature of the current environment. In this manner, the precision of feature extraction can be significantly improved; and further, based on high-efficiency and high-precision feature extraction, the precision and accuracy of trajectory prediction results can be significantly improved.

BRIEF DESCRIPTION OF DRAWINGS

The drawings are used for providing a further understanding of the present application and constitute a part of the description. The drawings are intended to explain the present application in conjunction with embodiments of the present application and not to limit the present application.

DETAILED DESCRIPTION

Figure 1:
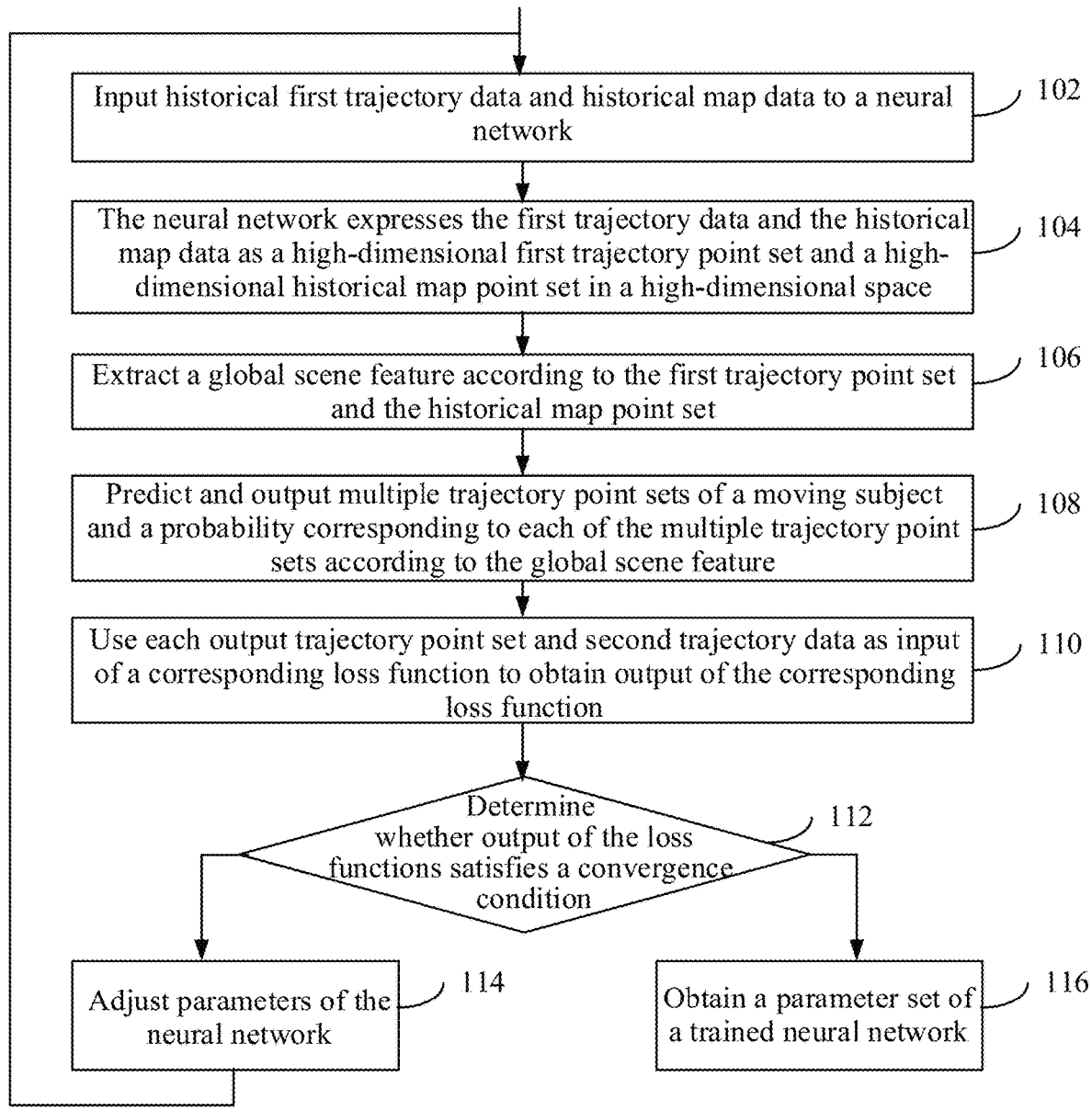
FIG. 1 is a processing flowchart of a training method for a trajectory prediction neural network according to an embodiment of the present application.

For a better understanding of technical solutions in the present application by those skilled in the art, the technical solutions in embodiments of the present application will be described clearly and completely in conjunction with the drawings in embodiments of the present application. Apparently, the embodiments described below are part, not all, of embodiments.

Based on embodiments in the present application, all other embodiments obtained by those of ordinary skill in the art without creative work are within the protection scope of the present application.

In robotics or autonomous driving technology, a very important technology is how to make safe and reliable path planning for a robot or an autonomous vehicle. Path planning relies on accurately and effectively predicting motion trajectories of other dynamic objects in an environment where the robot or the autonomous vehicle is located. Based on the accurate and effective prediction of motion trajectories of dynamic objects, safe and reliable path planning can be made for the robot or the autonomous vehicle.

In the existing art, a motion trajectory of an object may be predicted through a variety of methods.

In a prediction method based on historical trajectory data, a neural network is built and then trained by using the historical trajectory data so that a neural network capable of trajectory prediction is obtained. In this method, operations performed by the neural network generally include a feature extraction operation and a prediction operation. Time-space features (that is, temporal and spatial features) of driving trajectories of dynamic objects (such as vehicles, motorcycles, bicycles, or pedestrians) in a period of time in the past are obtained through the feature extraction operations, and trajectories of vehicles in a period of time in the future are predicted based on the extracted temporal and spatial features through the prediction operation. In the feature extraction operation, multiple time points (or referred to as temporal features) are generally extracted, spatial features of dynamic objects at each time point are extracted, and then the spatial features are integrated with the temporal features.

In the preceding feature extraction operation, spatial feature extraction is a very time-consuming operation, and such a process cannot be applied in a real-time processing environment. In addition, spatial relation or spatial influences between dynamic objects at different time points are discarded so that in the feature extraction operation, the complex relation and influence of spatial features between multiple time points cannot be simulated. Such a prediction process can only bring unreliable prediction results. Further, this method cannot handle input data with noise. The input data with noise generally refers to incomplete trajectory data of a certain dynamic object. This method generally has two kinds of processing for the incomplete trajectory data, one is to delete all trajectory data of the dynamic object, and the other is to fill in the incomplete trajectory data. Such limitation apparently affects the accuracy and precision of the prediction results and makes the preceding method unable to be applied in a real-time application environment.

In another method based on historical trajectory and road information, high-precision map information and driving trajectories of different vehicles in the environment are generally represented by a rasterized image of a top-view perspective, RGB values of pixels in the rasterized image are input to the neural network, and the neural network extracts features based on the input data and performs trajectory prediction based on the extracted features. Although this method can retain trajectory information and road structure information, an area of a scene that needs to be represented is relatively large, and the use of image representation results in excessive storage of redundant information (for example, a large number of places without vehicles correspond to pixels in the image), which in turn results in the problem of low computational efficiency of subsequent neural networks.

It is to be seen that the trajectory prediction method in the existing art has the problems that the prediction operation takes a long time, is low in efficiency, and cannot be applied in a real-time processing environment, and the prediction results are low in accuracy, reliability, and efficiency.

In view of this, embodiments of the present application provide a trajectory prediction solution, so as to solve part or all of the preceding problems.

In the present application, autonomous driving technology is used as an example to describe the trajectory prediction solution provided in the present application. Those skilled in the art can understand that the trajectory prediction solution provided in the present application may also be applied in other technical fields such as the field of robotics.

The term "vehicle" is broadly interpreted in the present application to include any movable objects, including, for example, aircraft, boats, spacecraft, cars, trucks, vans, semi-trailers, motorcycles, golf carts, off-road vehicles, warehouse transport vehicles or agricultural vehicles and transport vehicles that run on tracks such as trams or trains and other rail vehicles. The "vehicle" in the present application may generally include a power system, a sensor system, a control system, peripheral equipment, and a computer system. In other embodiments, the vehicle may include more, fewer, or different systems.

The power system is a system that provides power for the vehicle and includes an engine/motor, a transmission, wheels/tires, and an energy unit.

The control system may include a combination of devices that control the vehicle and components of the vehicle such as a steering unit, a throttle, a brake unit, and other components.

The peripheral equipment may be equipment that allows the vehicle to interact with external sensors, other vehicles, external computing devices and/or users, such as a wireless communication system, a touch screen, a microphone and/or a speaker.

Based on the vehicle described above, the autonomous vehicle is further provided with a sensor system and an autonomous driving control device.

The sensor system may include multiple sensors configured to sense information of an environment where the vehicle is located and one or more actuators configured to change positions and/or directions of the sensors. The sensor system may include any combination of sensors such as global positioning system sensors, inertial measurement units, radio detection and ranging (RADAR) units, cameras, laser rangefinders, light detection and ranging (LIDAR) units and/or acoustic sensors; the sensor system may further include sensors (such as $O_2$ monitors, fuel gauges, engine thermometers, etc.) that monitor internal systems of the vehicle.

The autonomous driving control device may include at least one processor and at least one memory. The processor may include a central processing unit (CPU) and/or an image processing unit (GPU). At least one machine-executable instruction is stored in the at least one memory, and a program product including the at least one machine-executable instruction may be referred to as an autonomous driving control system. The autonomous driving control system may include multiple modules such as a map engine, a positioning module, a perception module, a navigation or path module, and an autonomous control module. Correspondingly, the at least one processor executes the at least one machine-executable instruction to achieve multiple corresponding functions, including functions such as map construction, positioning, perception, navigation or path planning, and vehicle control. The map engine and the positioning module are configured to provide map information and positioning information. The perception module is configured to perceive environment information of an environment where the vehicle is located according to information acquired by the sensor system and the map information provided by the map engine. The navigation or path module is configured to plan a driving path for the vehicle according to processing results of the map engine, the positioning module, and the perception module. The autonomous control module analyzes and converts decision-making information input of modules such as the navigation or path module into control command output to a vehicle control system and sends control commands to corresponding components in the vehicle control system through an in-vehicle network (for example, an internal electronic network system of the vehicle achieved through manners such as a CAN bus, a local interconnection network, and multimedia directional system transmission) to achieve autonomous control of the vehicle; the autonomous control module may also acquire information of components in the vehicle through the in-vehicle network.

In a process of planning a path for the vehicle, it is necessary to use trajectory prediction technology to predict driving trajectories of surrounding dynamic objects (such as vehicles, motorcycles, bicycles, or pedestrians) in a period of time in the future in real time so that the autonomous driving system can make safe and reliable path planning based on the prediction result.

Embodiments of the present application provide a learning-based trajectory prediction solution, and the solution includes two stages, which are a training stage and a real-time processing stage.

In the training stage, a neural network is set up, where the neural network has a specific network structure and an initial parameter set. The neural network is trained to learn based on historical real data by using a supervised learning method. In the case where a training result satisfies a convergence condition, the parameter set of the neural network is obtained. The neural network with a specific network structure and the parameter set obtained through training is a neural network that achieves trajectory prediction or is referred to as a trajectory prediction neural network.

In the real-time processing stage, in the case where trajectory prediction is performed on a dynamic subject, current trajectory point set data of the dynamic subject and surrounding dynamic objects and current map point set data of the current environment are provided to the trajectory prediction neural network, the neural network processes movement data, and multiple trajectory point sets of the dynamic subject in the future and a probability corresponding to each trajectory point set are predicted.

Solutions of the present application will be described below through multiple embodiments.

Obtaining the Trajectory Prediction Neural Network Through Training

In the training stage, a neural network is constructed, where the neural network may include multiple network layers, and an initial parameter set is set for the neural network. The number of network layers in the neural network and the initial parameter set may be set according to requirements of application scenarios.

In embodiments of the present application, the constructed neural network is trained by using historically real first trajectory data, historically real second trajectory data, and historical map data.

In embodiments of the present application, the first trajectory data and the second trajectory data include multiple trajectory points of the moving subject and one or more moving objects surrounding the moving subject, and each trajectory point includes a spatial position at a corresponding time point. The spatial position may be a two-dimensional position, a three-dimensional position, or a high-dimensional position. For example, in the case where the vehicle is driving on a relatively flat road, the amplitude of road elevation change is very small, elevation information may be ignored, and the trajectory data may include only two-dimensional positions of the moving subject and the moving objects. In other fields, for example, a special-purpose robot may have relatively significant elevation changes in a movement process, and the trajectory data may include three-dimensional positions of the moving subject and the moving objects. In other application scenarios, in the case where position information of other dimensions exist or needs to be considered, the trajectory data may also include high-dimensional position data. For the sake of simplicity and convenience, the two-dimensional position is used as an example for explanation and description in this application. Those skilled in the art can understand that in the case where the spatial position is the three-dimensional position or the high-dimensional position, the three-dimensional position or the high-dimensional position may be subjected to corresponding position conversion, coordinate conversion and other processing, or corresponding position processing and coordinate processing are performed according to requirements of specific application scenarios.

In embodiments of the present application, the first trajectory data and the second trajectory data are data sets that are adjacent to each other in time. For example, the first trajectory data is a data set of an i-th time period, and the second trajectory data is a data set of an (i+1)-th time period. The duration of the i-th time period is m, and the duration of the (i+1)-th time period is n. In some embodiments, m may be equal to n, for example, each of the i-th time period and the (i+1)-th time period includes a duration of 3 seconds. In other embodiments, m may be not equal to n, for example, the duration of the i-th time period is 3 seconds, and the duration of the (i+1)-th time period is 2 seconds. In the i-th time period, multiple time points are obtained according to a frequency u, and in the (i+1)-th time period, multiple time points are obtained according to a frequency v, where u may be equal or not equal to v.

The historical map data includes spatial positions of multiple map points of road elements in an environment where the moving subject is located in a time period (for example, the i-th time period) corresponding to the first trajectory data. The historical map data may come from a high-precision map in a process of vehicle driving. The road elements may be lane lines, sidewalks, road edges, ramps, intersections, roundabouts, and other elements. In the present application, the road elements such as lane lines are sampled according to a predetermined distance so that a series of map points are obtained, where each map point records a spatial position of the map point. Corresponding to spatial positions of the preceding trajectory points, spatial positions of the map points may also be two-dimensional positions, three-dimensional positions, or high-dimensional positions.

FIG. 1 shows a processing flow of a training method of a trajectory prediction neural network according to an embodiment of the present application. The training processing includes multiple times of iteration training, where one time of iteration training includes the processing described below.

In step 102, historical first trajectory data and historical map data are input to a neural network.

In step 104, the neural network expresses the first trajectory data and the historical map data as a first trajectory point set and a historical map point set in a high-dimensional space.

In step 106, a global scene feature is extracted according to the first trajectory point set and the historical map point set, where the global scene feature has a trajectory feature and a map feature of a current environment.

In step 108, multiple trajectory point sets of a moving subject and a probability corresponding to each of the multiple trajectory point sets are predicted and output according to the global scene feature, where each of the multiple trajectory point sets includes spatial positions of the moving subject at multiple time points in a future predetermined time period.

In step 110, each of the output trajectory point sets and second trajectory data are used as input of a corresponding loss function so that output of the corresponding loss function is obtained.

In step 112, whether output of all loss functions satisfies a preset convergence condition is determined; in the case where it is determined that the convergence condition is satisfied, the processing proceeds to step 116; and in the case where it is determined that the convergence condition is not satisfied, the processing returns to step 114.

In step 114, parameters of the neural network are adjusted, and the processing returns to step 102.

In step 116, it is determined that the training is completed, and a parameter set of a trained neural network is obtained.

The process shown in FIG. 1 is described below through an exemplary embodiment.

It is assumed that the number of the moving subject and moving objects is N, the first trajectory data includes T time points, and $x_n^t \in R^2$ denotes a two-dimensional position of the moving subject or moving object n at a time point t, where $t \in \{1, \ldots, T\}$, and $R^2$ is the representation of a two-dimensional space. The trajectory data of the moving subject or a moving object n may be represented as $X_n = \{H_n, F_n\}$, where $H_n = \{x_n^1, x_n^2, \ldots, x_n^T\}$ denotes historical positions of the object from a past time point 1 to an observation time T, and $F_n = \{x_n^{T+1}, x_n^{T+2}, \ldots, x_n^{T+s}\}$ denotes future positions of the object from a future time point T+1 to a time point T+s. $H_n$ may be regarded as the first trajectory point set, and $F_n$ may be regarded as a second trajectory point set.

It is assumed that the historical map point set includes a number $\hat{N}$ of lane lines, the time period corresponding to the first trajectory data is from the time point 1 to the observation time point T, and map data of the $\hat{n}$-th lane line in this time period is $C_{\hat{n}} = \{c_{\hat{n}}^0, \ldots, c_{\hat{n}}^{\hat{T}}\}$, where $C_{\hat{n}}$ denotes map positions of a number $\hat{T}$ of sampled map points included in the n̂-th lane line, and $C_{\hat{n}}^{\hat{t}} \in R^2$ denotes a map position of a sampled map point $\hat{t}$ in the n̂-th lane line.

The object of trajectory prediction is to predict a prediction trajectory point set distributed in a multi-modal manner through $\{H_n\}_{n=1}^N$ and map data $\{C_{\hat{n}}\}_{\hat{n}=1}^{\hat{N}}$, where the prediction trajectory point set distributed in the multi-modal manner best fits with $\{F_n\}_{n=1}^N$.

Figure 2A:
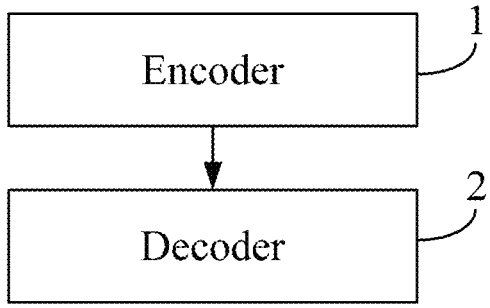
FIG. 2A is a structure diagram of a trajectory prediction neural network according to an embodiment of the present application.
Figure 2B:
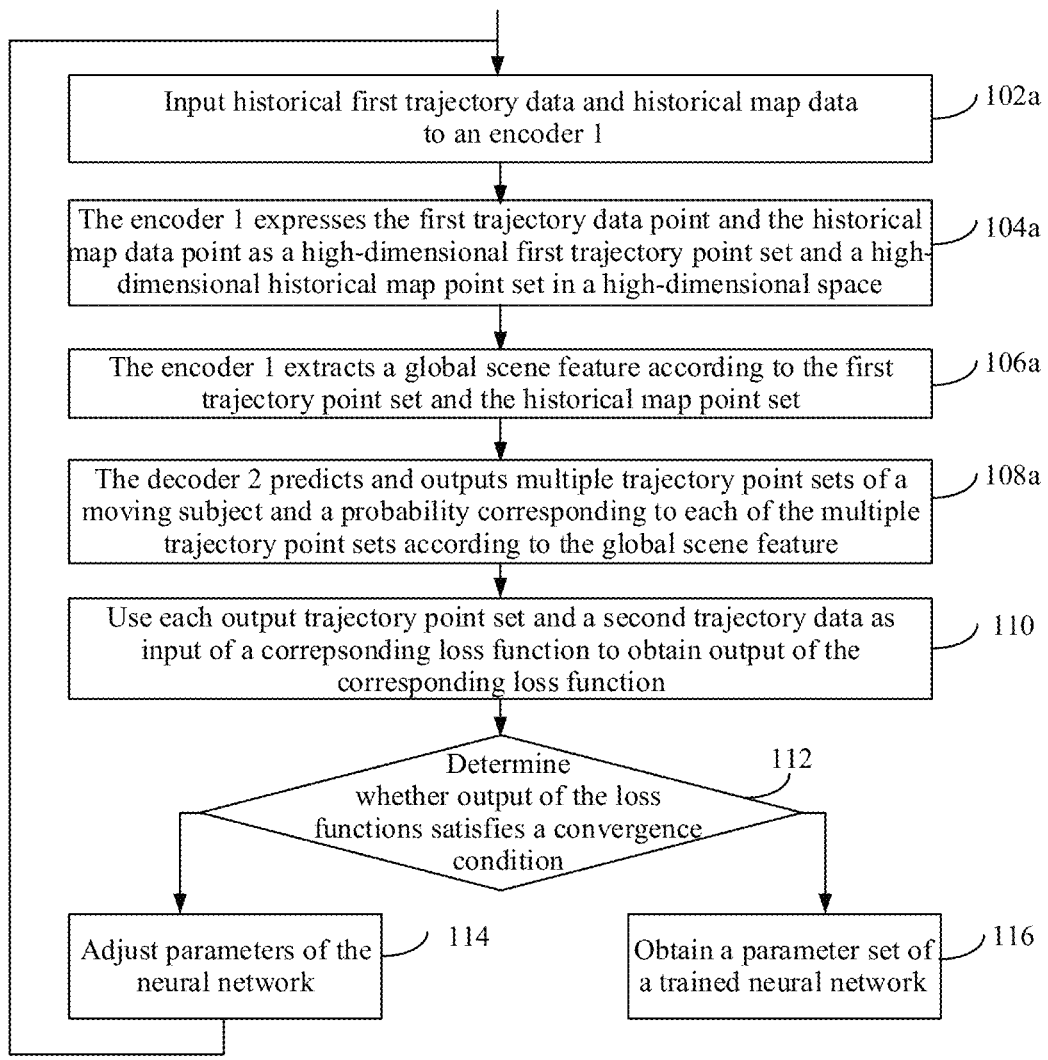
FIG. 2B is another processing flowchart of a training method for a trajectory prediction neural network according to an embodiment of the present application.

In this exemplary embodiment, as shown in FIG. 2A, the structure of the neural network may include an encoder 1 and a decoder 2 according to achieved functions. In this exemplary embodiment, the training processing of the neural network includes the process shown in FIG. 2B.

In step 102a, historical first trajectory data and historical map data are input to the encoder 1.

In step 104a, the encoder 1 expresses the first trajectory data and the historical map data as a first trajectory point set and a historical map point set in a high-dimensional space.

In step 106a, the encoder 1 extracts a global scene feature according to the first trajectory point set and the historical map point set, where the global scene feature has a trajectory feature and a map feature of an environment where a moving subject is located.

In step 108a, the decoder 2 predicts and outputs multiple trajectory point sets of the moving subject and a probability corresponding to each of the multiple trajectory point sets according to the global scene feature, where each of the multiple trajectory point sets includes spatial positions of the moving subject at multiple time points in a future predetermined time period.

In step 110, each of the output trajectory point sets and the second trajectory point set are used as input of a corresponding loss function so that output of the corresponding loss function is obtained.

In step 112, whether output of all loss functions satisfies a preset convergence condition is determined; in the case where it is determined that the convergence condition is satisfied, the processing proceeds to step 116; and in the case where it is determined that the convergence condition is not satisfied, the processing returns to step 114.

In step 114, parameters of the neural network are adjusted, and the processing returns to step 102a.

In step 116, it is determined that the training is completed, and a parameter set of a trained neural network is obtained.

The following describes the processing of the preceding steps 104a to 108a through structure settings of the neural network in some embodiments.

Figure 3:
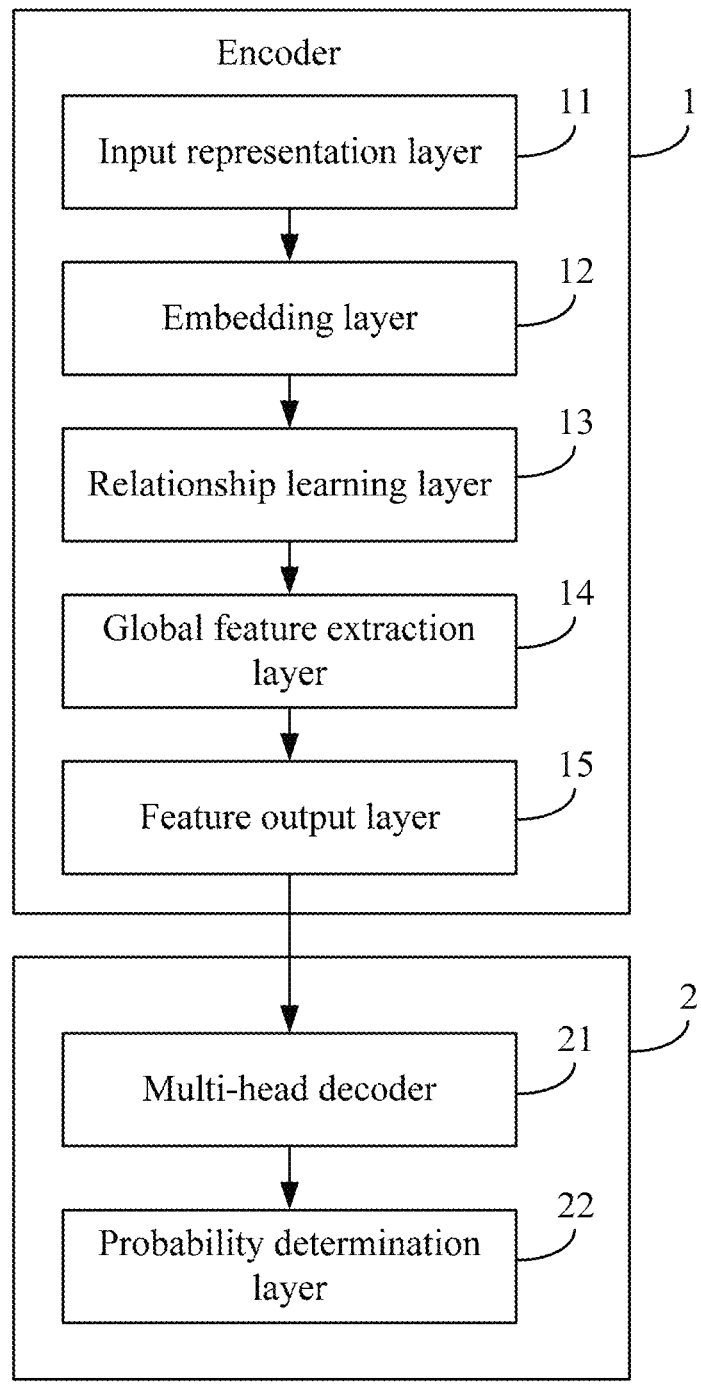
FIG. 3 is another structure diagram of a trajectory prediction neural network according to an embodiment of the present application.
Figure 4:
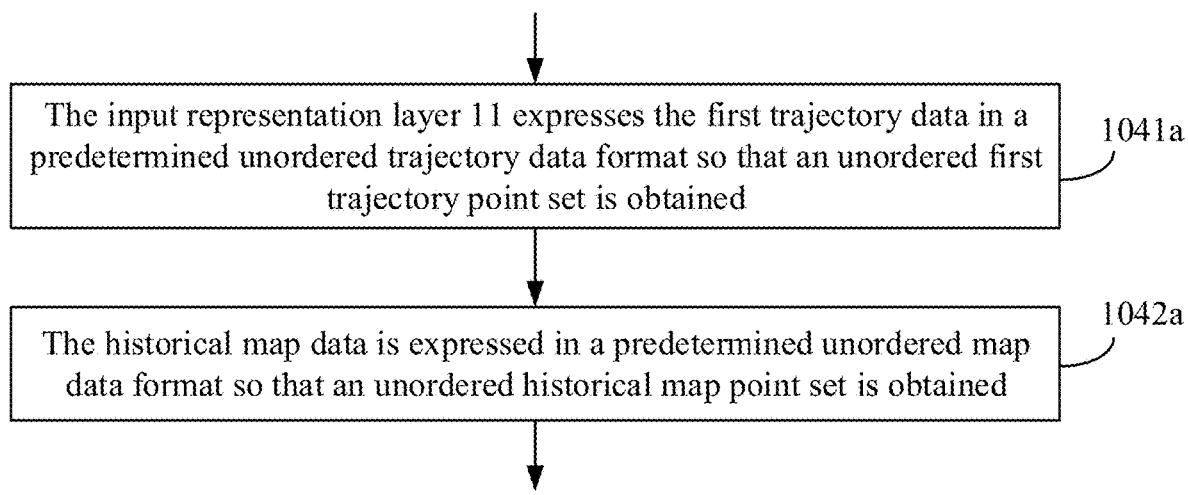
FIG. 4 is a processing flowchart of step 104*a* in FIG. 2B.

In some embodiments, as shown in FIG. 3, an input representation layer 11 may be disposed in the encoder 1 to implement step 104a. As shown in FIG. 4, step 104a may be implemented as the processing described below.

In step 1041a, the input representation layer 11 expresses the first trajectory data in a predetermined unordered trajectory data format so that an unordered first trajectory point set is obtained.

In step 1042a, the historical map data is expressed in a predetermined unordered map data format so that an unordered historical map point set is obtained.

In step 1041a, a preset trajectory data format may be set according to requirements of specific application scenarios. In an example, for the sake of simplicity and scalability, the first trajectory data may be expressed by using a trajectory data format shown in formula (1) described below.

$$P_n^t = \{x_n^t, t\}, P = \{p_n^t | \forall n \in \{1, \ldots, N\}\} \quad (1)$$

$n \in \{1, \ldots, N\}$ denotes the moving subject and one or more moving objects, $t \in \{1, \ldots, T\}$ denotes multiple time points, and $x_n^t$ denotes a two-dimensional position of the object n at time t (that is, a trajectory point). $p_n^t$ denotes a corresponding point of a spatial position $x_n^t$ of the object n at time t mapped to the high-dimensional space, and P denotes the first trajectory point set mapped to the high-dimensional space.

In step 1042a, the historical map point set is represented by using a map data format shown in formula (2) described below.

$$m_{\hat{n}}^{\hat{t}} = \{c_{\hat{n}}^{\hat{t}}\}, M = \{m_{\hat{n}}^{\hat{t}} | \forall \hat{t} \in \{1, \ldots, \hat{T}\}, \forall \hat{n} \in \{1, \ldots, \hat{N}\}\} \quad (2)$$

$c_{\hat{n}}^{\hat{t}}$ denotes a map position of the sampled map point $\hat{t}$ in the n̂-th lane line, the n̂-th lane line includes a number $\hat{T}$ of sampled map points, and the historical map point set includes a number $\hat{N}$ of lane lines. $m_{\hat{n}}^{\hat{t}}$ denotes a corresponding point of the sampled map point $c_{\hat{n}}^{\hat{t}}$ mapped to the high-dimensional space, and M denotes the historical map point set mapped to the high-dimensional space.

Figure 5A:
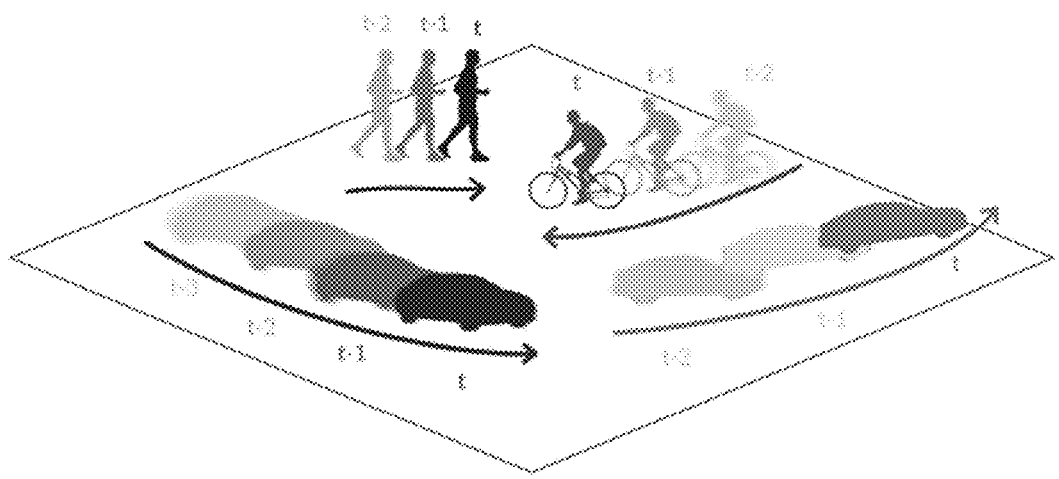
FIG. 5A is a schematic view of dynamic objects in a scene.
Figure 5B:
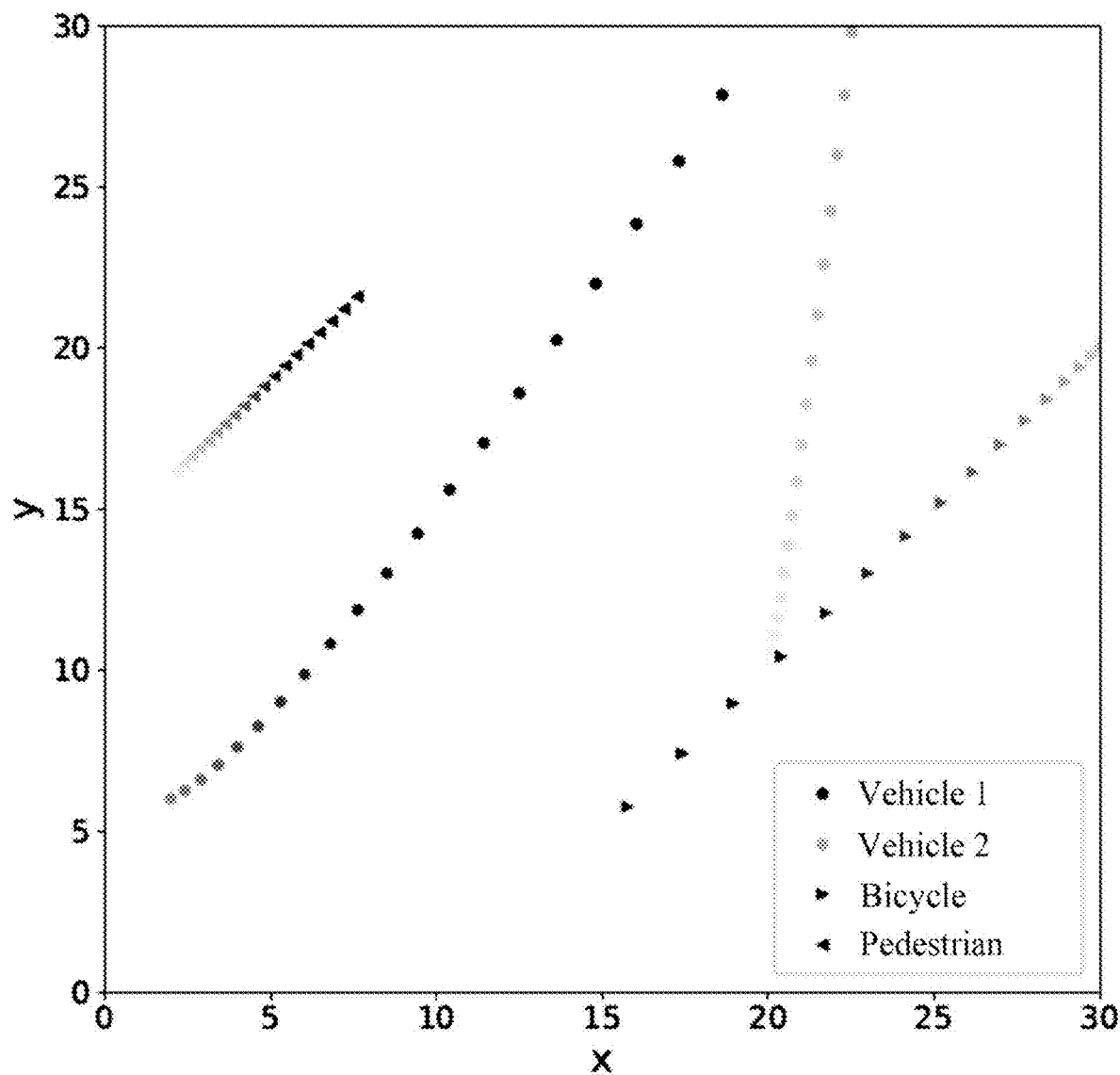
FIG. 5B is a schematic diagram of expression of trajectories of the dynamic objects in the scene in FIG. 5A by using a traditional method.
Figure 5C:
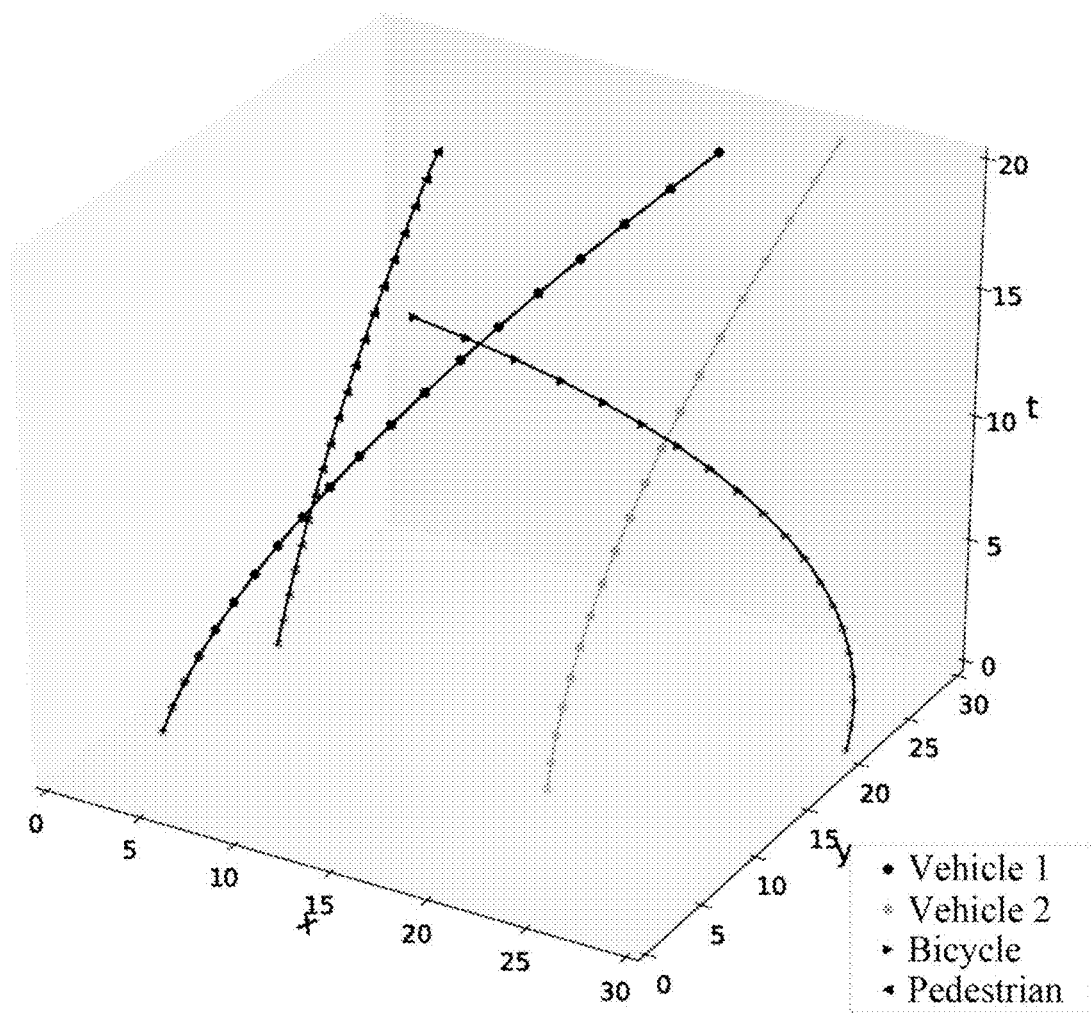
FIG. 5C is a schematic diagram of expression of the trajectories of the dynamic objects in the scene in FIG. 5A by using a method according to an embodiment of the present application.

In an exemplary scenario, the input representation layer 11 maps data in the first trajectory data to the high-dimensional space (for example, a time-space coordinate system) by using formula (1). In this scenario, as shown in FIG. 5A, the dynamic objects include two vehicles, a bicycle, and a pedestrian. FIG. 5B shows a situation in which trajectories of the dynamic objects in the scenario are expressed by using a traditional representation method, that is, the two-dimensional position of the dynamic object is expressed in a two-dimensional spatial coordinate system. In the two-dimensional spatial coordinate system, each data point only has a spatial feature. FIG. 5C shows a situation in which the first trajectory point set of the scenario is expressed in the time-space coordinate system by using a data expression method provided in embodiments of the present application. In this time-space coordinate system, the x-axis and the y-axis denote two-dimensional spatial coordinate axes, and the z-axis is the time axis; each data point in the coordinate system has both temporal and spatial features.

The first trajectory data is expressed by using a predetermined unordered expandable data format, and chronological position data of the moving subject and moving objects may be mapped to the time-space coordinate system, that is, the ordered data is mapped into discrete unordered point sets. The high-dimensional first trajectory point set expressed in the time-space coordinate system does not change with the change of an expression mode or an expression order of the first trajectory data, and the following case is avoided: the data of an object cannot be expressed due to missing data of the object. It is to be seen that the first trajectory data is mapped to the high-dimensional space so that the following problem in the existing art can be solved: additional processing is required in the case where input data has noise; in this manner, the robustness of processing input data some of which is missing can be improved. In addition, all the data in the first trajectory data can be uniformly expressed in the same high-dimensional space (for example, a time-space coordinate system) by using a predetermined data format, and temporal features and spatial features can be unified into the same expression so that unified and integrated temporal and spatial features can be extracted through subsequent feature extraction processing.

The input representation layer 11 expresses the historical map data by using a predetermined unordered data format, that is, formula (2), so that road elements can be expressed as discrete unordered point sets in the high-dimensional space (for example, a time-space coordinate system). The map point set expressed in the time-space coordinate system does not change with the change of an expression mode or an expression order of road data, and the following case is avoided: road elements cannot be expressed due to missing data in the road elements.

On the other hand, in the embodiment of the present application, the trajectory data of the moving subject and moving objects and the map data of the road elements are expressed as discrete unordered high-dimensional data point sets in the high-dimensional space; while in the existing art, high-precision map information and driving trajectories of different vehicles are represented by using a rasterized image, and RGB values of pixels in the rasterized image are input to the neural network for feature extraction. Therefore, compared with the existing art, the amount of data processed by the neural network can be significantly reduced, and the processing speed and efficiency of the neural network can be improved.

Figure 6:
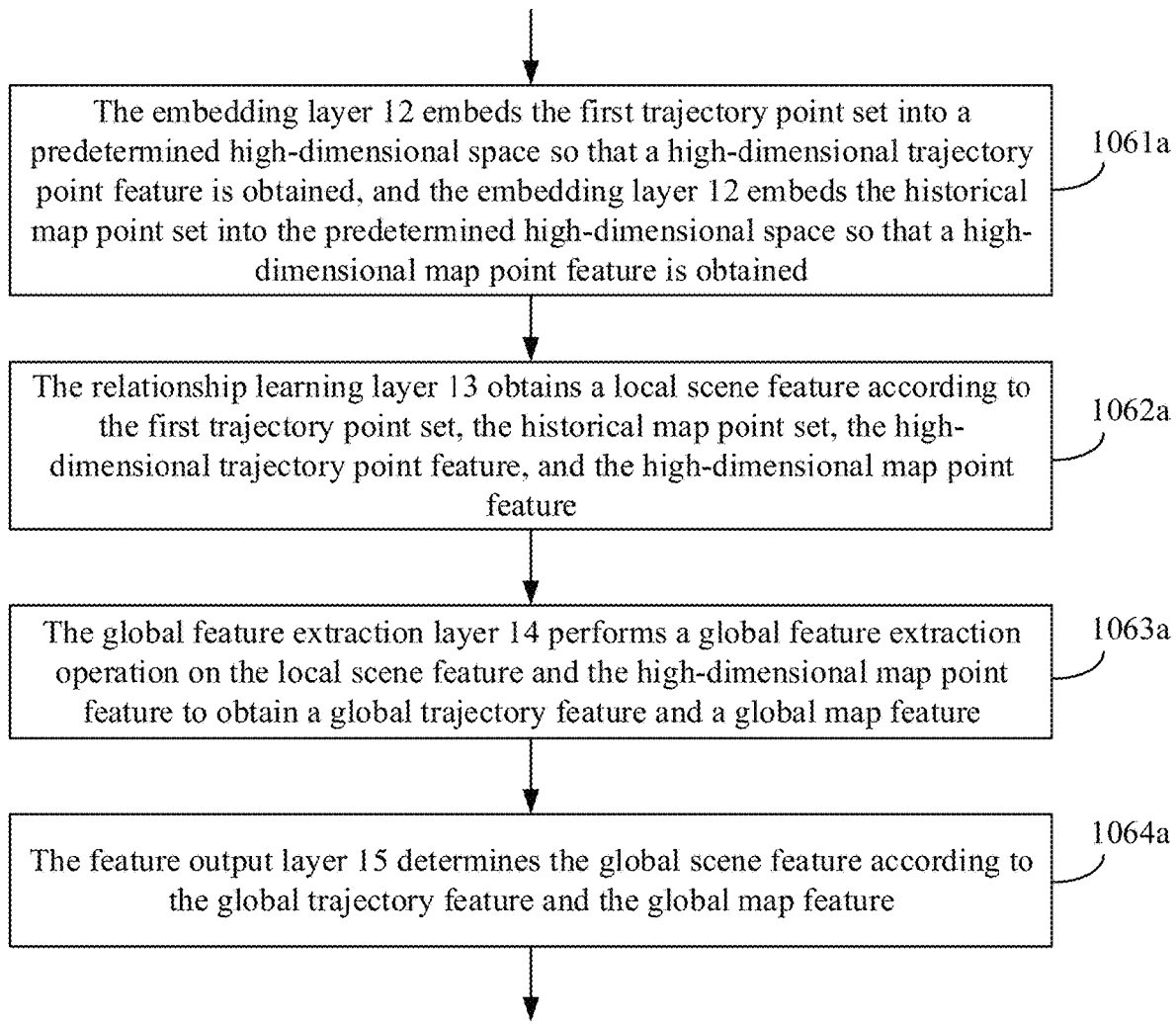
FIG. 6 is a processing flowchart of step 106a in FIG. 2B.

In some embodiments, as shown in FIG. 3, an embedding layer 12, a relationship learning layer 13, a global feature extraction layer 14, and a feature output layer 15 may be disposed in the encoder 1 to implement step 106a. As shown in FIG. 6, step 106a may be implemented as the processing described below.

In step 1061a, the embedding layer 12 embeds the first trajectory point set into a predetermined high-dimensional space so that a high-dimensional trajectory point feature is obtained, and the embedding layer 12 embeds the historical map point set into the predetermined high-dimensional space so that a high-dimensional map point feature is obtained.

The object of the embedding operation is to map the high-dimensional trajectory point $p_n^t$ in the high-dimensional space into a hidden trajectory feature $\bar{p}_n^t$, where the trajectory feature can unify the temporal and spatial features of data. In some embodiments, the embedding layer 12 may be implemented by a multilayer perceptron (MLP). The MLP may include a fully connected multilayer network, and an activation function of neurons in the network may be the ReLU activation function. Further, a batch normalization (BN) layer may also be set after each layer of the embedding layer.

For ease of description, the operation of embedding (or mapping) the first trajectory point set to the high-dimensional space may be expressed by using formula (3) described below. $MLP_p$ denotes an MLP.

$$\bar{p}_n^t = MLP_p(p_n^t) \quad (3)$$

In the same way, the embedding principle of the historical map point set is similar.

The high-dimensional map point $m_{\hat{n}}^{\hat{t}}$ may be mapped into the map feature $\bar{m}_{\hat{n}}^{\hat{t}}$ by using formula (4) described below. $MLP_m$ is an MLP.

$$\bar{m}_{\hat{n}}^{\hat{t}} = MLP_m(m_{\hat{n}}^{\hat{t}}) \quad (4)$$

In the embedding operation, the high-dimensional first trajectory point set and the high-dimensional historical map point set are embedded into a high-dimensional space composed by multiple dimensions, and data in each dimension includes temporal features and spatial features.

In step 1062a, the relationship learning layer 13 obtains a local scene feature according to the first trajectory point set, the historical map point set, the high-dimensional trajectory point feature, and the high-dimensional map point feature, where the local scene feature is a high-dimensional trajectory point feature with local map information.

Figure 7A:
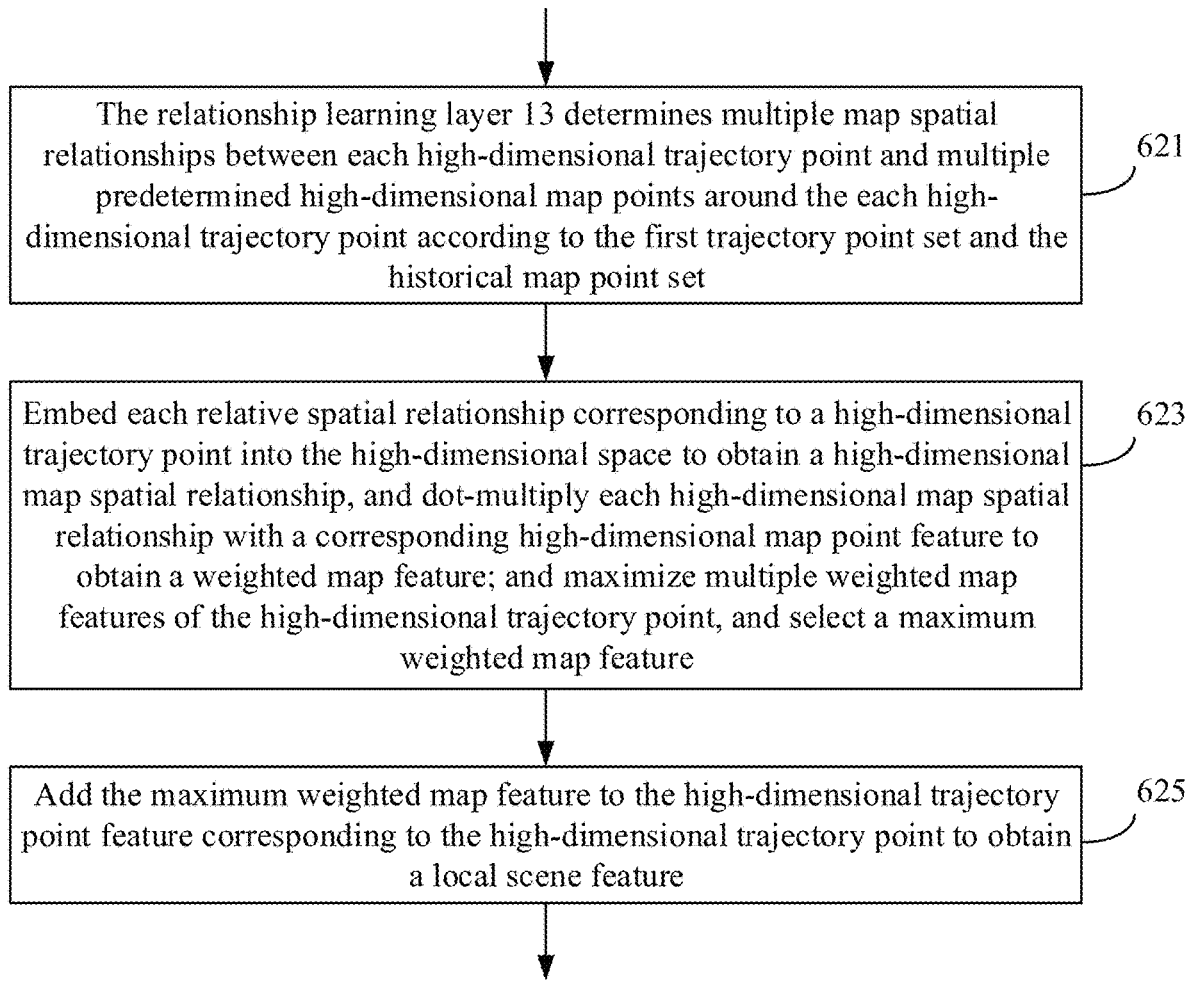
FIG. 7A is a processing flowchart of step 1062*a* in FIG. 6.

In an example, as shown in FIG. 7A, step 1062a may be implemented as the processing described below.

In step 621, the relationship learning layer 13 determines multiple map spatial relationships between each high-dimensional trajectory point and multiple predetermined high-dimensional map points around the each high-dimensional trajectory point according to the first trajectory point set and the historical map point set.

Figure 7B:
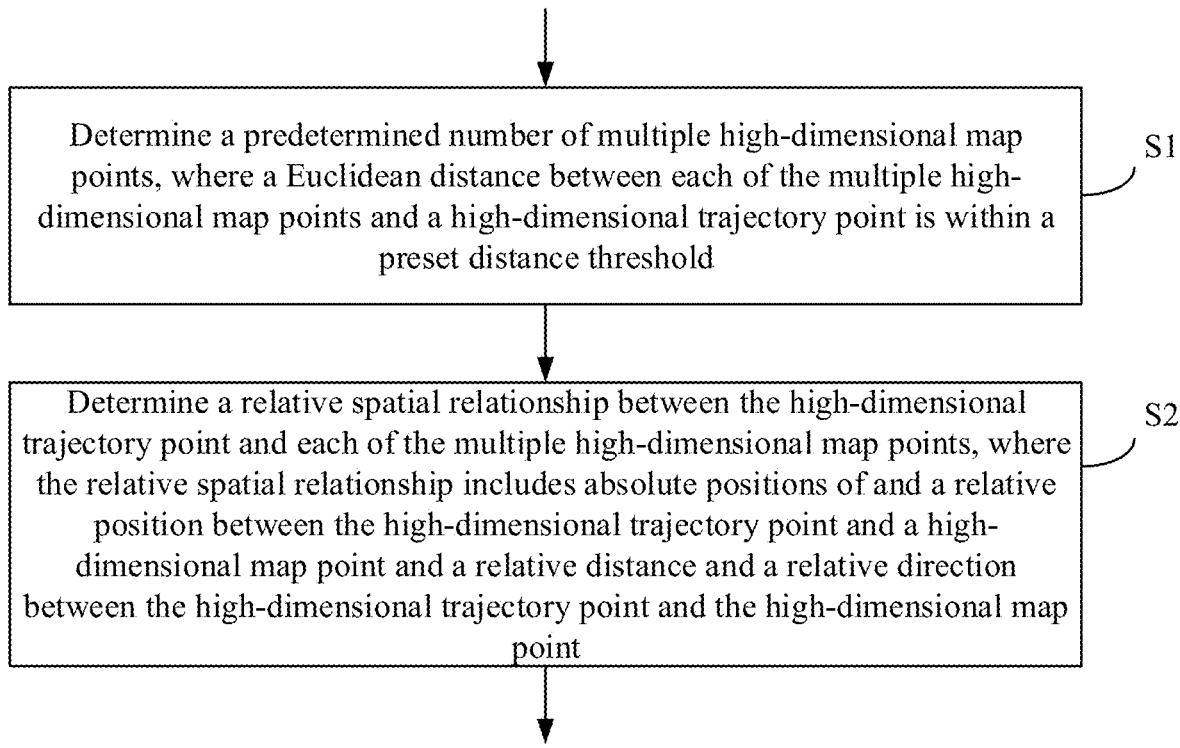
FIG. 7B is a processing flowchart of step 621 in FIG. 7A.

In an example, a network for performing calculation processing may be disposed in the relationship learning layer 13 to implement step 621. As shown in FIG. 7B, the implementation process of step 621 may include steps described below.

In step S1, a predetermined number of multiple high-dimensional map points are determined, where a Euclidean distance between each of the multiple high-dimensional map points and a high-dimensional trajectory point is within a preset distance threshold.

Figure 8:
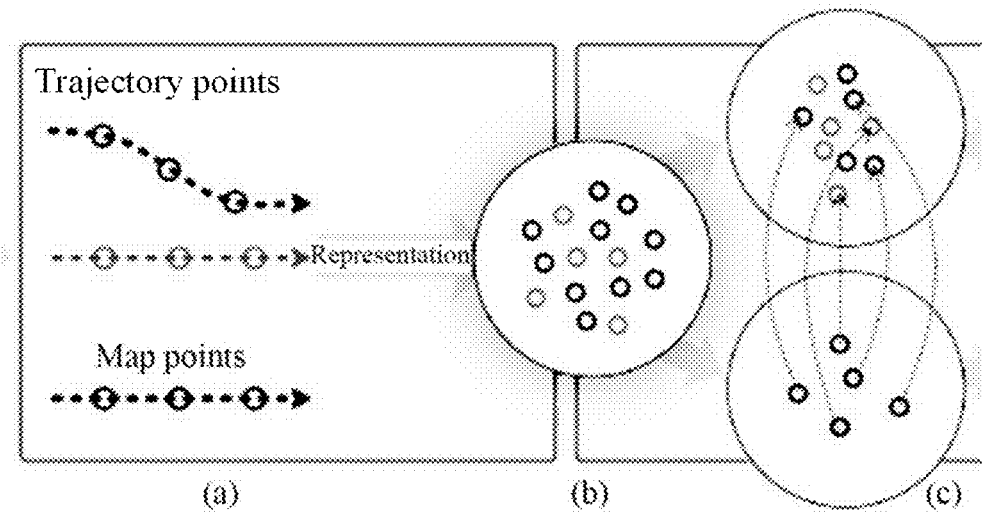
FIG. 8 is a schematic diagram of determining adjacent high-dimensional map points of a high-dimensional trajectory point in an example.

In an example, as shown in FIG. 8, part (a) represents trajectory points in the first trajectory data and map points in the historical map data. After the first trajectory data and the historical map data are represented by using the input representation layer 11, high-dimensional trajectory points and high-dimensional map points as shown in part (b) are obtained; and through step S1, multiple high-dimensional map points adjacent to a high-dimensional trajectory point are obtained as shown in part (c).

Figure 9:
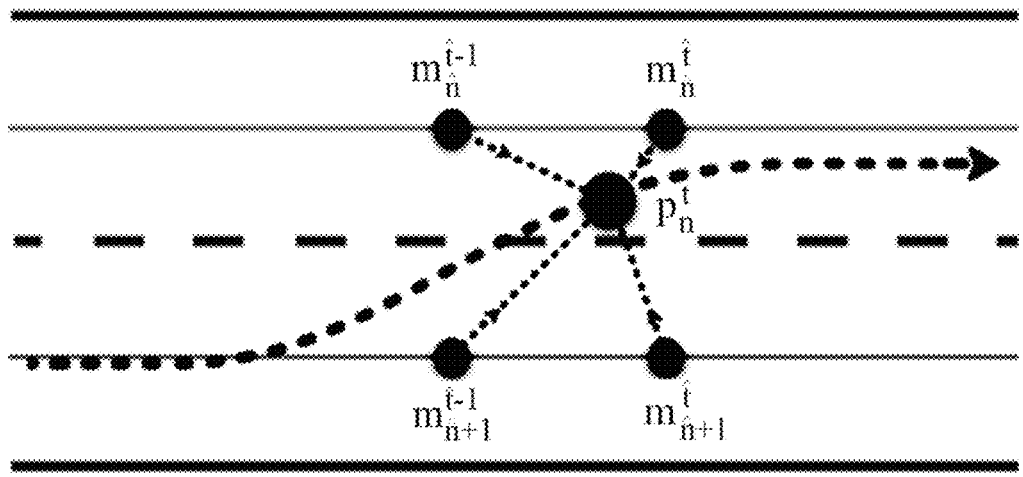
FIG. 9 is a schematic diagram of propagation by using map relationship learning in an example.

FIG. 9 shows this association through an intuitive expression. Four adjacent high-dimensional map points, $m_{\hat{n}}^{\hat{t}-1}$, $m_{\hat{n}}^{\hat{t}}$, $m_{\hat{n}+1}^{\hat{t}}$, $m_{\hat{n}+1}^{\hat{t}+1}$ exist within a preset distance of a high-dimensional trajectory point $p_n^t$. An arrow pointing to the high-dimensional trajectory point from the high-dimensional map point represents a process of propagating the local map feature to the trajectory feature to obtain the relative spatial relationship by using relationship learning, that is, step S2 described below.

In step S2, a relative spatial relationship between the high-dimensional trajectory point and each of the multiple high-dimensional map points is determined, where the relative spatial relationship includes absolute positions of and a relative position between the high-dimensional trajectory point and a high-dimensional map point, and a relative distance and a relative direction between the high-dimensional trajectory point and the high-dimensional map point.

$x_n^t$ denotes the absolute position of the high-dimensional trajectory point, $c_{\hat{n}}^{\hat{t}}$ denotes the absolute position of the high-dimensional map point, $(x_n^t - c_{\hat{n}}^{\hat{t}})$ denotes the relative position between the high-dimensional trajectory point and the high-dimensional map point, $\text{dist}(x_n^t, c_{\hat{n}}^{\hat{t}})$ denotes the relative distance between the high-dimensional trajectory point and the high-dimensional map point, $\cos(v_n^t, u_{\hat{n}}^{\hat{t}})$ denotes the relative direction between the high-dimensional trajectory point and the high-dimensional map point, $y_{\hat{n}}^{\hat{t}} = c_{\hat{n}}^{\hat{t}} - c_{\hat{n}}^{\hat{t}-1}$, $v_n^t = v_n^t - v_n^{t-}$, and $v_n^t$ denotes the speed of the moving subject or moving object n at the time point t. The relative spatial relationship $e_{n\hat{n}}^{t\hat{t}}$ between a high-dimensional trajectory point and a high-dimensional map point may be expressed as formula (5) described below.

$$e_{n\hat{n}}^{t\hat{t}} = \{x_n^t, c_{\hat{n}}^{\hat{t}} x_n^t - c_{\hat{n}}^{\hat{t}}, \text{dist}(x_n^t, c_{\hat{n}}^{\hat{t}}), \cos(v_n^t, u_{\hat{n}}^{\hat{t}})\} \quad (5)$$

In step 623, each relative spatial relationship corresponding to a high-dimensional trajectory point is embedded into the high-dimensional space so that a high-dimensional map spatial relationship is obtained, and each high-dimensional map spatial relationship is dot-multiplied with a corresponding high-dimensional map point feature so that a weighted map feature is obtained; and multiple weighted map features of the high-dimensional trajectory point are maximized, and a maximum weighted map feature is selected.

Multiple relative spatial relationships corresponding to a high-dimensional trajectory point are all embedded in the high-dimensional space, the embedding operation of the preceding formula (3) or (4) may be referred to for this operation, and the embedding layer (for example, the multilayer perceptron (MLP)) may be disposed in the relationship learning layer 13 to perform the embedding operation. After the embedding operation, multiple high-dimensional map spatial relationships can be obtained, and the multiple high-dimensional map spatial relationships are dot-multiplied with the high-dimensional trajectory point so that multiple dot multiplication results, that is, multiple weighted map features, are obtained. A network layer that achieves dot multiplication calculation may be disposed in the relationship learning layer 13 to perform a dot multiplication operation. The maximum weighted map feature can be obtained after multiple dot multiplication results are maximized, and a pooling layer (for example, a maximum pooling layer or an average pooling layer) may be disposed in the relationship learning layer 13 to achieve the maximum processing.

In step 625, the maximum weighted map feature is added to the high-dimensional trajectory point feature corresponding to the high-dimensional trajectory point so that a local scene feature is obtained.

The processing of steps 623 and 625 may be expressed through formula (6).

$$\tilde{p}_n^t = \bar{p}_n^t + A(\{MLP_e(e_{nn}^{\hat{n}}) \cdot \tilde{m}_n^{\hat{t}}, \forall \tilde{m}_n^{\hat{t}} \in \text{top } k\}) \quad (6)$$

$\tilde{p}_n^t$ denotes the local scene feature, a symbol A denotes a maximization process, $MLP_e$ denotes an embedding process of the relative spatial relationship, $\tilde{m}_n^{\hat{t}}$ denotes the high-dimensional map point feature, and k denotes the predetermined number of map points, where a Euclidean distance between each map point and a trajectory point is within a preset distance threshold.

Through the processing shown in FIG. 7A, map information of multiple high-dimensional map points around a high-dimensional trajectory point may be propagated to the high-dimensional trajectory point, that is, local map information around a high-dimensional trajectory point may be propagated to the high-dimensional trajectory point so that the local scene feature with the local map information and temporal and spatial information of trajectory points is obtained. The local scene feature provides a data basis for subsequently obtaining prediction trajectory point sets with higher precision.

In step 1063a, the global feature extraction layer 14 performs a global feature extraction operation on the local scene feature and the high-dimensional map point feature to obtain a global trajectory feature and a global map feature.

Figure 10:
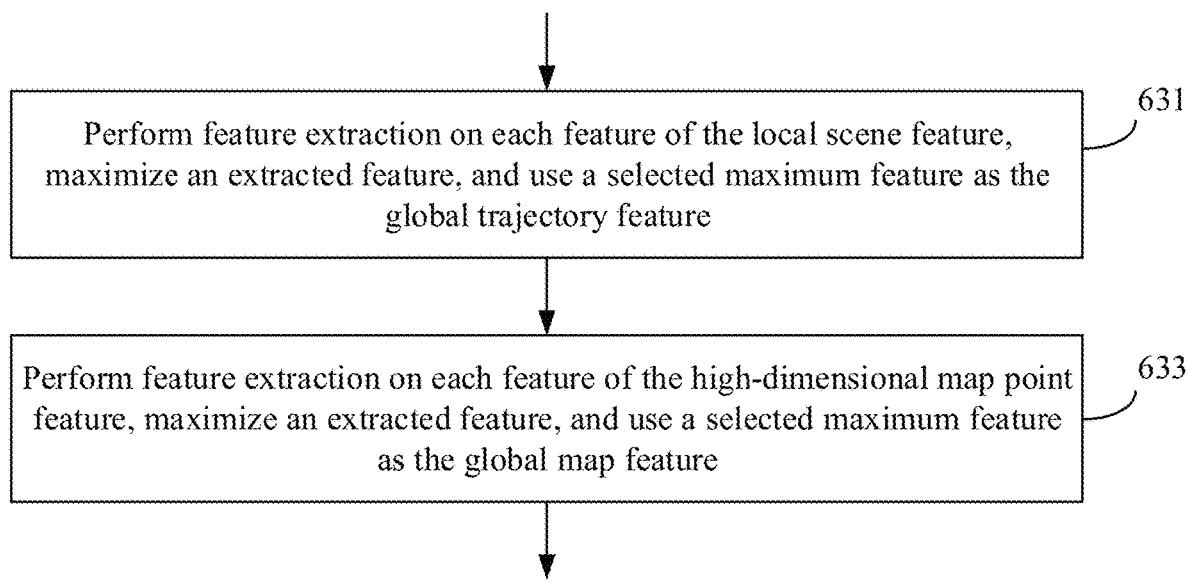
FIG. 10 is a processing flowchart of step 1063*a* in FIG. 6.

In an embodiment, as shown in FIG. 10, step 1063a may be implemented as the processing described below.

In step 631, feature extraction is performed on each feature in the local scene feature, the extracted feature is maximized, and a selected maximum feature is used as the global trajectory feature.

In step 633, feature extraction is performed on each feature in the high-dimensional map point feature, the extracted feature is maximized, and a selected maximum feature is used as the global map feature.

After the local scene feature and the high-dimensional map point feature are obtained, different arrangements of data need to be kept invariant. The feature extraction layer performs feature extraction on data of each dimension included in the high-dimensional space and obtains the global map feature that integrates temporal feature and spatial feature and the global trajectory feature that integrates the local map feature. The global feature includes multi-dimensional features, and each dimension corresponds to a part of a feature space, that is, expresses a part of temporal and spatial features.

In some embodiments, the global feature extraction layer 14 may include a pooling layer through which the global feature extraction layer 14 sequentially extracts the global trajectory feature and the global map feature, or may include two parallel pooling layers through which the global feature extraction layer 14 extracts the global trajectory feature and the global map feature, respectively.

In step 1064a, the feature output layer 15 determines the global scene feature according to the global trajectory feature and the global map feature.

The feature output layer 15 adds the global trajectory feature to the global map feature so that the global scene feature is obtained. The global scene feature includes the global map feature and the global trajectory feature and provides a data basis for subsequently obtaining prediction trajectory point sets with higher precision.

After the decoder 1 determines that the global scene feature is obtained, the decoder 2 may perform prediction processing according to the global scene feature.

In some embodiments, as shown in FIG. 3, a multi-head decoder 21 and a probability determination layer 22 may be disposed in the decoder 2.

The multi-head decoder 21 may include multiple sub-decoders, where each sub-decoder may be a recurrent neural network or an MLP. The recurrent neural network includes a long-short term memory (LSTM) or a gated recurrent unit (GRU). In some other embodiments, a stochastic decoder may also be selected.

Each sub-decoder has a specific initial parameter set, a prediction trajectory point set is predicted according to the global scene feature, and the multi-head decoder 21 outputs multiple prediction trajectory point sets.

The probability determination layer 22 is configured to determine the probability corresponding to each of the multiple prediction trajectory point sets. The probability determination layer 22 may be a classifier.

In step 110, each output trajectory point set and the second trajectory point set are used as input of a corresponding loss function so that output of the corresponding loss function is obtained.

The loss function may be a negative log likelihood (NLL) function of the Gaussian distribution.

Through the preceding training, the parameter set of the neural network may be obtained, and the neural network with the parameter set obtained through training and a specific structure is the trajectory prediction neural network. Through the trajectory prediction neural network, the input current trajectory point set and current map point set may be processed in the real-time processing stage, and multiple prediction trajectory point sets in the future time period and the probability corresponding to each prediction trajectory point set may be predicted.

Through the preceding training process, the historical first trajectory data is mapped into the first trajectory point set in the high-dimensional space, and the historical map data is mapped into the historical map point set in the high-dimensional space so that the ordered trajectory data is transformed into unordered data points, the subsequent impact of data noise can be overcome, and the robustness of data processing can be improved. The feature extraction of the trajectory data and map data can be achieved through end-to-end learning so that the speed and efficiency of the feature extraction operation can be significantly improved, and real-time requirements of application scenarios can be satisfied. The extracted global scene feature has the global trajectory feature and the global map feature, the global trajectory feature integrates the local map feature and trajectory feature, and the trajectory feature has both temporal feature and spatial feature. Through the prediction trajectory point set obtained based on the global scene feature prediction, the precision and accuracy of the trajectory prediction results can be significantly improved.

Trajectory Prediction in the Real-Time Processing Stage

Figure 11:
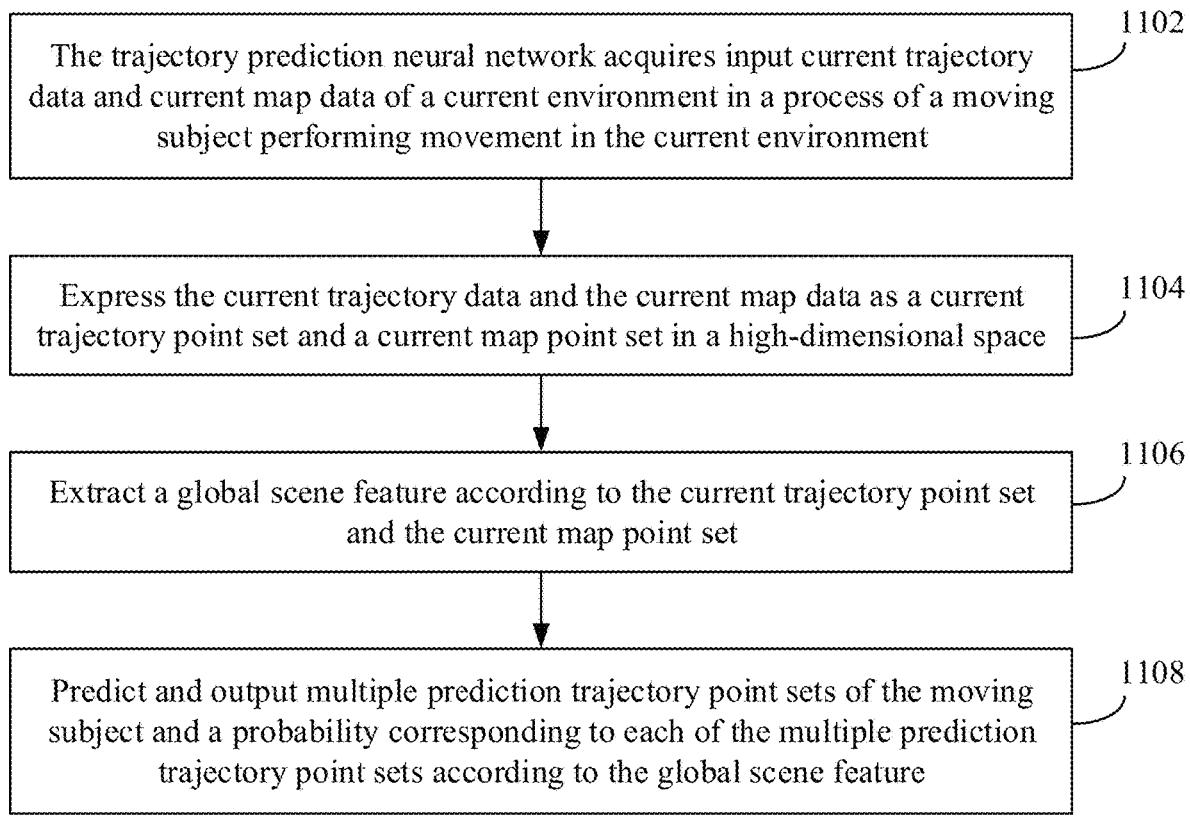
FIG. 11 is a processing flowchart of a trajectory prediction method in a real-time processing stage according to an embodiment of the present application.

Corresponding to the processing shown in FIG. 1, FIG. 11 shows the process of predicting motion trajectories of objects through the trajectory prediction neural network in the real-time processing stage.

In step 1102, the trajectory prediction neural network acquires the input current trajectory data and current map data of a current environment in a process of a moving subject performing movement in the current environment, where the current trajectory data includes multiple trajectory points of the moving subject and one or more other moving objects in the current environment in a past predetermined time period, each of the multiple trajectory points includes a spatial position at a corresponding time point, and the current map data includes spatial positions of multiple map points of road elements in the current environment in the predetermined time period.

In step 1104, the current trajectory data and the current map data are expressed as a current trajectory point set and a current map point set in a high-dimensional space, where the current trajectory point set includes high-dimensional trajectory points to which trajectory points in the current trajectory data each correspond, and the current map point set includes high-dimensional map points to which map points in the current map data each correspond.

In step 1106, a global scene feature is extracted according to the current trajectory point set and the current map point set, where the global scene feature has a trajectory feature and a map feature of the current environment.

In step 1108, multiple prediction trajectory point sets of the moving subject and a probability corresponding to each of the multiple prediction trajectory point sets are predicted and output according to the global scene feature, where each of the multiple prediction trajectory point sets includes spatial positions of the moving subject at multiple time points in a future predetermined time period.

The processing shown in FIG. 11 is described below through an exemplary embodiment. In this example, the neural network may be the neural network shown in FIG. 3. The neural network includes the encoder 1 and the decoder 2. The encoder 1 includes the input representation layer 11, the embedding layer 12, the relationship learning layer 13, the global feature extraction layer 14, and the feature output layer 15. The decoder 2 includes the multi-head decoder 21 and the probability determination layer 22.

In step 1102, the current trajectory data input to the trajectory prediction neural network may come from an upstream module such as a perception module. The perception module selects the current trajectory data from perceptual data, and provides the current trajectory data for the encoder 1 of the trajectory prediction neural network. The current map data input to the trajectory prediction neural network may be high-precision map data from an upstream map module.

The setting of the current trajectory data may be the same as the setting of the preceding first trajectory data, and the setting of the current map data may be the same as the preceding current map data.

Step 1104 may be executed through the input representation layer 11 as shown in FIG. 3.

In this example, the input representation layer 11 expresses the current trajectory data in a predetermined unordered trajectory data format so that an unordered current trajectory point set mapped in the high-dimensional space is obtained, where the trajectory data format may be a format shown in the preceding formula (1), and the current trajectory point set includes a high-dimensional trajectory point corresponding to each trajectory point in the current trajectory data. The input representation layer 11 expresses the current map data in a predetermined unordered map data format so that an unordered map point set mapped in the high-dimensional space is obtained, where the map data format may be a format shown in the preceding formula (2), and the current map point set includes a high-dimensional map point corresponding to each map point in the current map data.

For the specific processing of step 1104, refer to step 104a, the formula (1), the formula (2), and the processing shown in FIG. 4.

Figure 12:
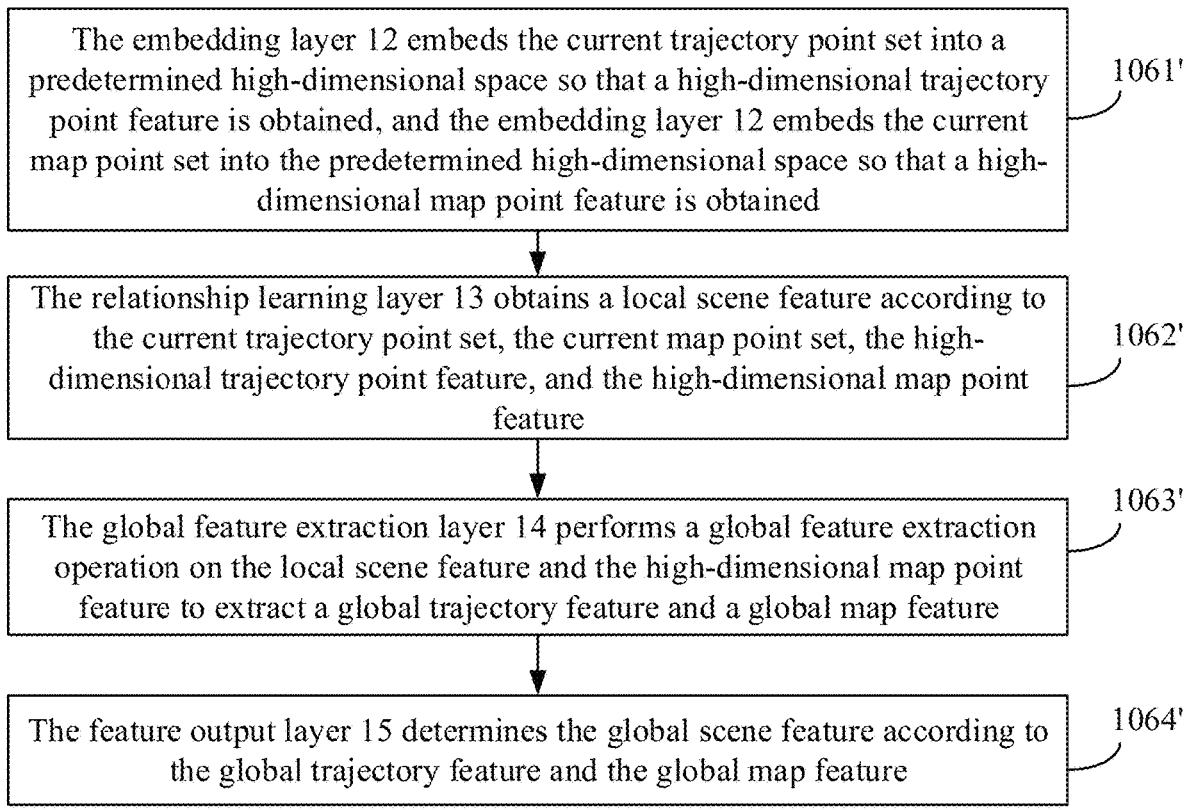
FIG. 12 is a processing flowchart of step 1106 in FIG. 11.

In this example, step 1106 may be performed by the embedding layer 12, the relationship learning layer 13, the global feature extraction layer 14, and the feature output layer 15 as shown in FIG. 3 with reference to the processing shown in FIG. 6. As shown in FIG. 12, step 1106 may include steps described below.

In step 1061', the embedding layer 12 embeds the current trajectory point set into a predetermined high-dimensional space so that a high-dimensional trajectory point feature is obtained, and the embedding layer 12 embeds the current map point set into the predetermined high-dimensional space so that a high-dimensional map point feature is obtained. The specific operation of the embedding layer 12 may be implemented by using the preceding formula (3) and formula (4) with reference to the processing of step 1061a.

In step 1062', the relationship learning layer 13 obtains a local scene feature according to the current trajectory point set, the current map point set, the high-dimensional trajectory point feature, and the high-dimensional map point feature, where the local scene feature is a high-dimensional trajectory point feature with local map information. The specific operation of the relationship learning layer 13 may be implemented with reference to the processing of step 1062a.

In step 1063', the global feature extraction layer 14 performs a global feature extraction operation on the local scene feature and the high-dimensional map point feature to extract a global trajectory feature and a global map feature. The specific operation of the global feature extraction layer 14 may be implemented with reference to step 1063a.

In step 1064', the feature output layer 15 determines the global scene feature according to the global trajectory feature and the global map feature. The specific operation of the global feature extraction layer 15 may be implemented with reference to step 1064a.

Figure 13:
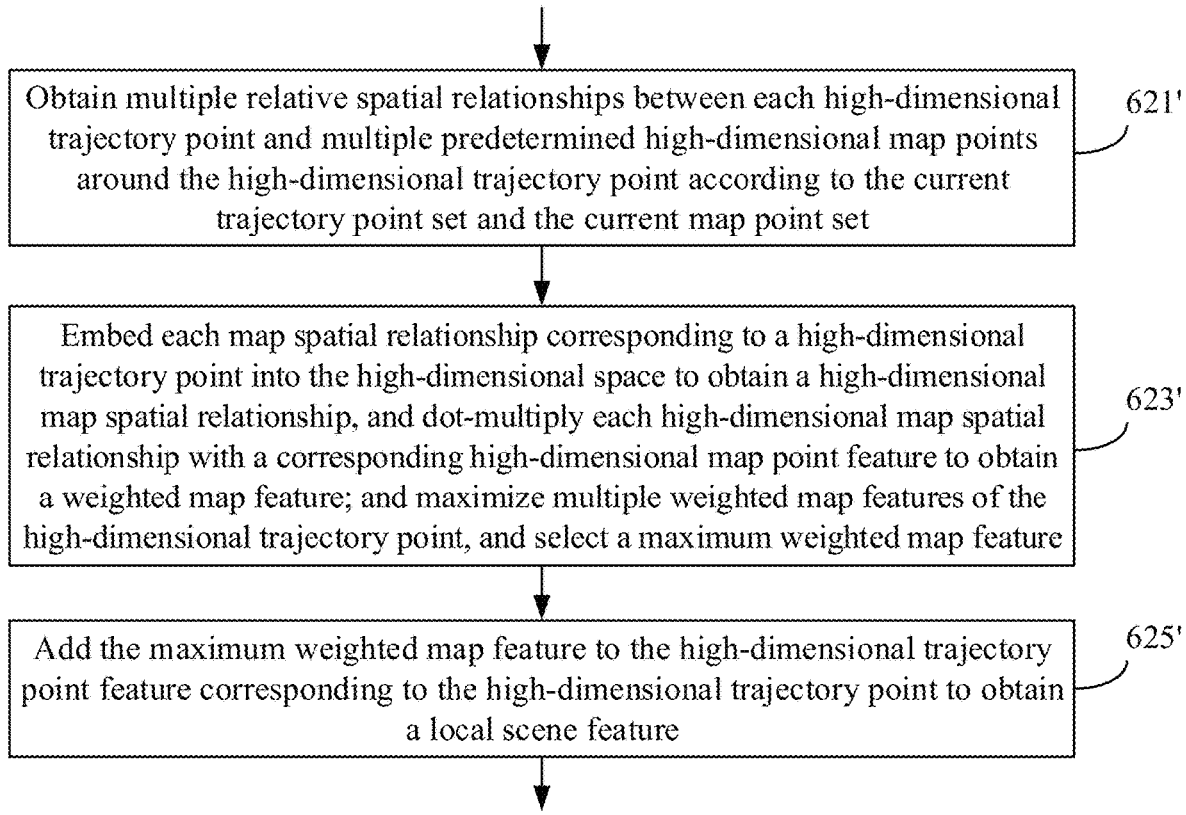
FIG. 13 is a processing flowchart of step 1062' in FIG. 12.

Exemplarily, referring to FIG. 7A and step 1062a, as shown in FIG. 13, the processing of the relationship learning layer 13 in step 1062' may include steps described below.

In step 621', multiple relative spatial relationships between each high-dimensional trajectory point and multiple predetermined high-dimensional map points around the high-dimensional trajectory point are obtained according to the current trajectory point set and the current map point set. Referring to FIG. 7B and step 621, this processing includes determining a predetermined number of multiple high-dimensional map points, wherein a Euclidean distance between each of the multiple high-dimensional map points and a high-dimensional trajectory point is within a preset distance threshold; and determining a relative spatial relationship between the high-dimensional trajectory point and each of the multiple high-dimensional map points, where the relative spatial relationship includes absolute positions of and a relative position between the high-dimensional trajectory point and the high-dimensional map point, and a relative distance and a relative direction between the high-dimensional trajectory point and the high-dimensional map point. Refer to the preceding formula (5) for the expression of the relative spatial relationship.

In step 623', each map spatial relationship corresponding to a high-dimensional trajectory point is embedded into the high-dimensional space so that a high-dimensional map spatial relationship is obtained, and each high-dimensional map spatial relationship is dot-multiplied with a corresponding high-dimensional map point feature so that a weighted map feature is obtained; and multiple weighted map features of the high-dimensional trajectory point are maximized, and a maximum weighted map feature is selected.

In step 625', the maximum weighted map feature is added to the high-dimensional trajectory point feature corresponding to the high-dimensional trajectory point so that a local scene feature is obtained.

The operations of steps 623' and 625' may be implemented with reference to steps 623 and 625.

The local scene feature corresponding to a high-dimensional trajectory point may be expressed through the preceding formula (6). Multiple corresponding local scene features may be obtained through multiple high-dimensional trajectory points in the current trajectory point set.

Figure 14:
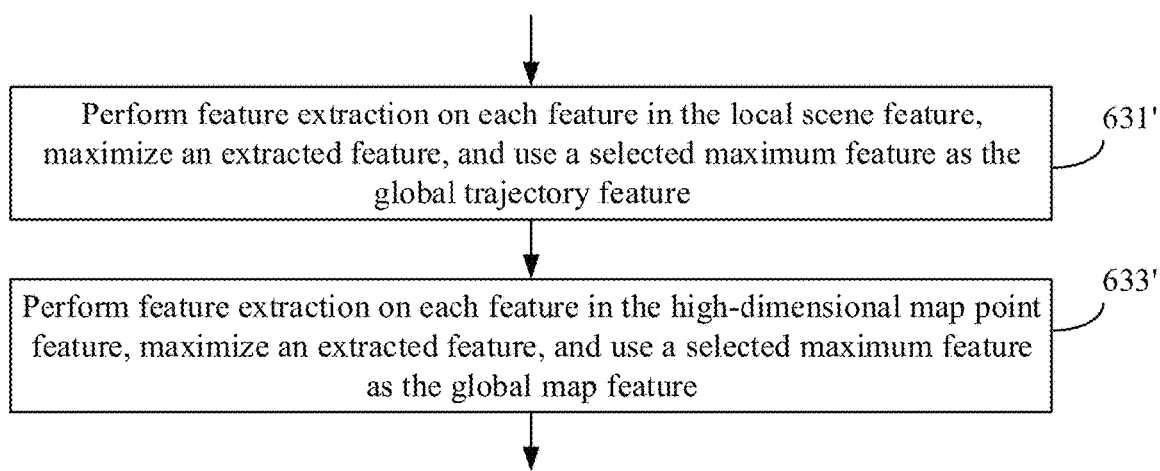
FIG. 14 is a processing flowchart of step 1063' in FIG. 12.

Exemplarily, referring to FIG. 10 and step 1063a, as shown in FIG. 14, the processing of the global feature extraction layer 14 in step 1063' includes steps described below.

In step 631', feature extraction is performed on each feature in the local scene feature, the extracted feature is maximized, and a selected maximum feature is used as the global trajectory feature.

In step 633', feature extraction is performed on each feature in the high-dimensional map point feature, the extracted feature is maximized, and a selected maximum feature is used as the global map feature.

Exemplarily, referring to step 1064a, the processing of the feature output layer 15 may include adding the global trajectory feature to the global map feature to obtain the global scene feature.

Through the preceding process, the current trajectory data is mapped into the current trajectory point set in the high-dimensional space, and the current map data is mapped into the current map point set in the high-dimensional space, the ordered trajectory data is transformed into unordered data points, so that the subsequent impact of data noise can be overcome, and the robustness of data processing can be improved. The feature extraction of trajectory data and map data can be achieved through end-to-end processing so that the speed and efficiency of the feature extraction operation can be significantly improved, and real-time requirements of application scenarios can be satisfied. The extracted global scene feature has the global trajectory feature and the global map feature, the global trajectory feature integrates the local map feature and trajectory feature, and the trajectory feature has both temporal feature and spatial feature; the global scene feature can provide an accurate and effective data basis for trajectory prediction.

In this example, in the processing of step 1108, the multi-head decoder 21 in the decoder 21 outputs multiple prediction trajectory point sets, and the probability determination layer 22 determines the probability corresponding to each of the multiple prediction trajectory point sets.

The decoder 2 can predict trajectory point sets with higher precision and accuracy based on more accurate and effective global scene features.

In some other embodiments, based on any of the preceding embodiments, data items in the first trajectory data, the second trajectory data, and the current trajectory data may also be divided and expanded, and the data items may be divided into trajectory data and attribute data. Correspondingly, the trajectory data format used by the input representation layer 11 is correspondingly expanded.

In an example, the trajectory data may include spatial positions and speeds of an object at multiple time points in a predetermined time period. In this case, based on the scalability of the predetermined data format, the trajectory data format is defined by using formula (7).

$$P_n^t = \{x_n^t, v_n^t, t\}, P = \{p_n^t | \forall t \in \{1, \ldots, N\}\} \quad (7)$$

$v_n^t$ denotes the speed of the object at time t.

Experiments and test results show that speed data is added to the trajectory data so that the precision of the trajectory prediction results can be further improved.

In another exemplary embodiment, the trajectory point set may include trajectory data and attribute data. The attribute data may include category data of an object, for example, the object is a pedestrian, a bicycle, or a vehicle. In specific application scenarios, the category data of the object may also be other attributes, for example, the attribute of the vehicle includes vans, tractors, semi-trailers, etc.. Attribute items of the car light such as headlight attribute data or taillight attribute data may also be added so that whether the car light is turned on or not is identified through the attribute data of the car light. In this case, the trajectory data format is defined by using formula (8).

$$P_n^t = \{x_n^t, v_n^t, \varnothing_n, t\}, P = \{p_n^t | \forall t \in \{1, \ldots, T\}, \forall n \in \{1, \ldots, N\}\} \quad (8)$$

$\varnothing_n$ denotes the category of the object, and the value of the category may be preset, for example, the value of the vehicle is 1, the value of the pedestrian is 2, and the value of the bicycle is 3. Exemplarily, one item of attribute data is expanded in the formula (8), and multiple items of attribute data may also be expanded according to requirements of specific application scenarios.

The attribute data may also include identification data of the object, for example, the object is a moving subject or a surrounding moving object. In this case, the trajectory data format is defined by using formula (9).

$$P_n^t = \{x_n^t, v_n^t, \varnothing_n, t, id\}, P = \{p_n^t | \forall t \in \{1, \ldots, T\}, \forall n \in \{1, \ldots, N\}\} \quad (9)$$

id identifies the object as a moving subject or a surrounding moving object. For example, in the case where the value of the data is 1, it means that the object n is a moving subject, and in the case where the value is 0, it means that the object n is a surrounding moving object.

Since the predetermined expandable data format may include multiple data according to requirements of application scenarios, the length of the data format is variable. In the existing art, if data items need to be added to or reduced from the input data, the research and development personnel need to manually arrange and fine-tune the data, which is a huge workload. Embodiments of the present application provide a data format with a variable length. In this manner, data items may be added to or reduced from the data format so that subsequent processing of the data can be performed and thus additional work caused by manual arrangement is avoided.

Further, the attribute data is added to the trajectory data so that the trajectory prediction network can be trained to learn and understand attributes of the object and thus the precision and accuracy of trajectory prediction can be improved.

In some other embodiments, based on any of the preceding embodiments, data items in the historical map data and the current map data may also be divided and expanded. Correspondingly, the map data format used by the input representation layer 11 is correspondingly expanded.

In an example, the map data may also include position differences between each map point and adjacent map points on the same road element as the map point. In this case, based on the scalability of the predetermined data format, the map data format is defined by using formula (10).

$$m_{\hat{n}}^{\hat{t}} = \{c_{\hat{n}}^{\hat{t}}, u_{\hat{n}}^{\hat{t}}, \hat{t}\}, M = \{m_{\hat{n}}^{\hat{t}} | \forall \hat{t} \in \{1, \ldots, \hat{T}\}, \forall \hat{n} \in \{1, \ldots, \hat{N}\}\} \quad (10)$$

$u_{\hat{n}}^{\hat{t}}$ denotes a position difference between a map point $\hat{t}$ and an adjacent previous map point $\hat{t}-1$ such as a position difference of two-dimensional coordinates or a position difference of three-dimensional coordinates.

The position difference between two adjacent map points are set so that the directionality and connectivity between multiple map points of road elements can be obtained in the subsequent processing of the trajectory prediction neural network.

Figure 15:
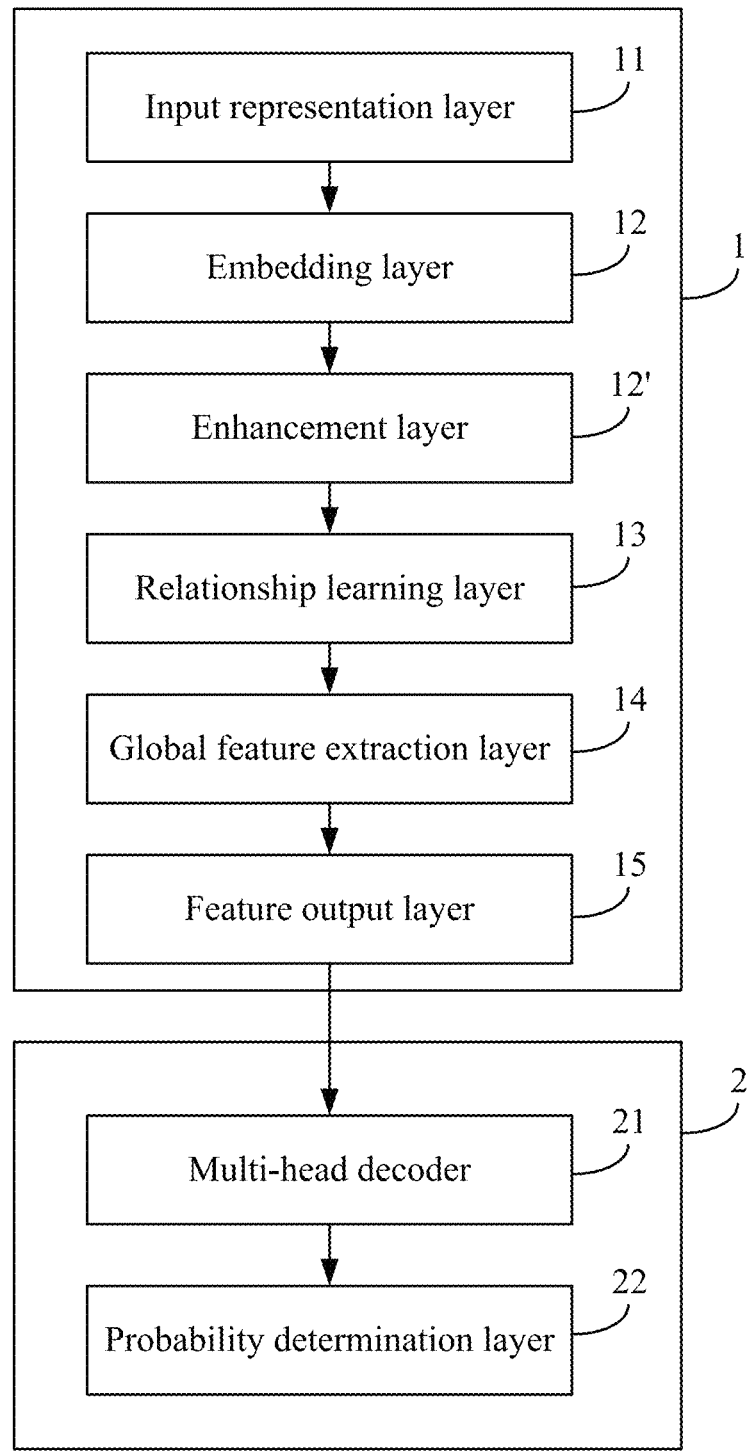
FIG. 15 is another structure diagram of a trajectory prediction neural network according to an embodiment of the present application.

In this example, after the embedding layer 12 processes to obtain the high-dimensional map point feature, that is, after step 1061a and step 1061', the directionality and connectivity enhancement processing is performed on the high-dimensional map point feature. Correspondingly, as shown in FIG. 15, based on the neural network shown in FIG. 3, an enhancement layer 12' may be disposed behind the embedding layer 12. The enhancement layer 12' may be a self-attention neural network.

In another example, the map data may also include attribute data of each map point, where the attribute data includes a category of a road element to which the map point belongs and a sequence number of the map point within multiple map points included in the predetermined time period in the road element to which the map point belongs.

Figure 16A:
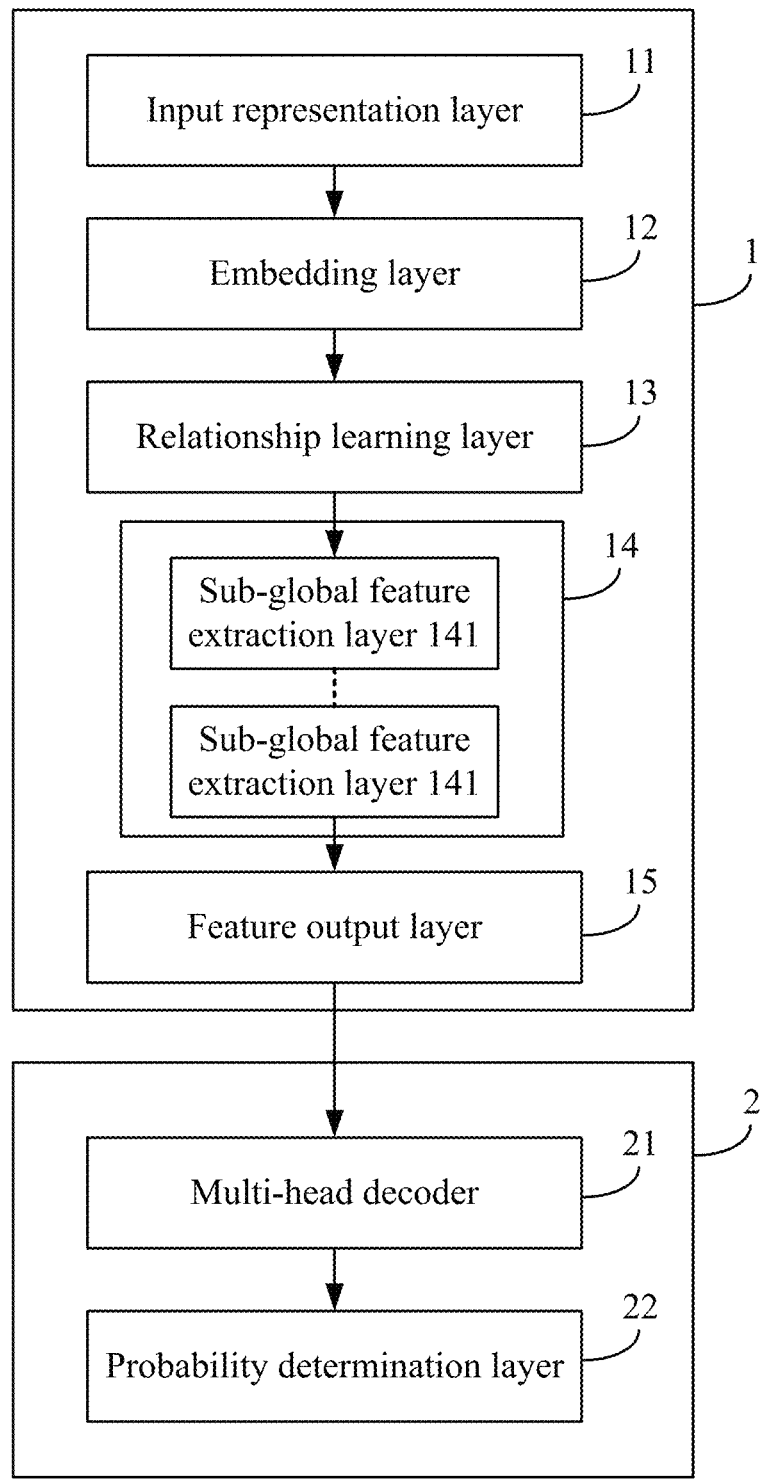
FIG. 16A is another structure diagram of a trajectory prediction neural network according to an embodiment of the present application.
Figure 16B:
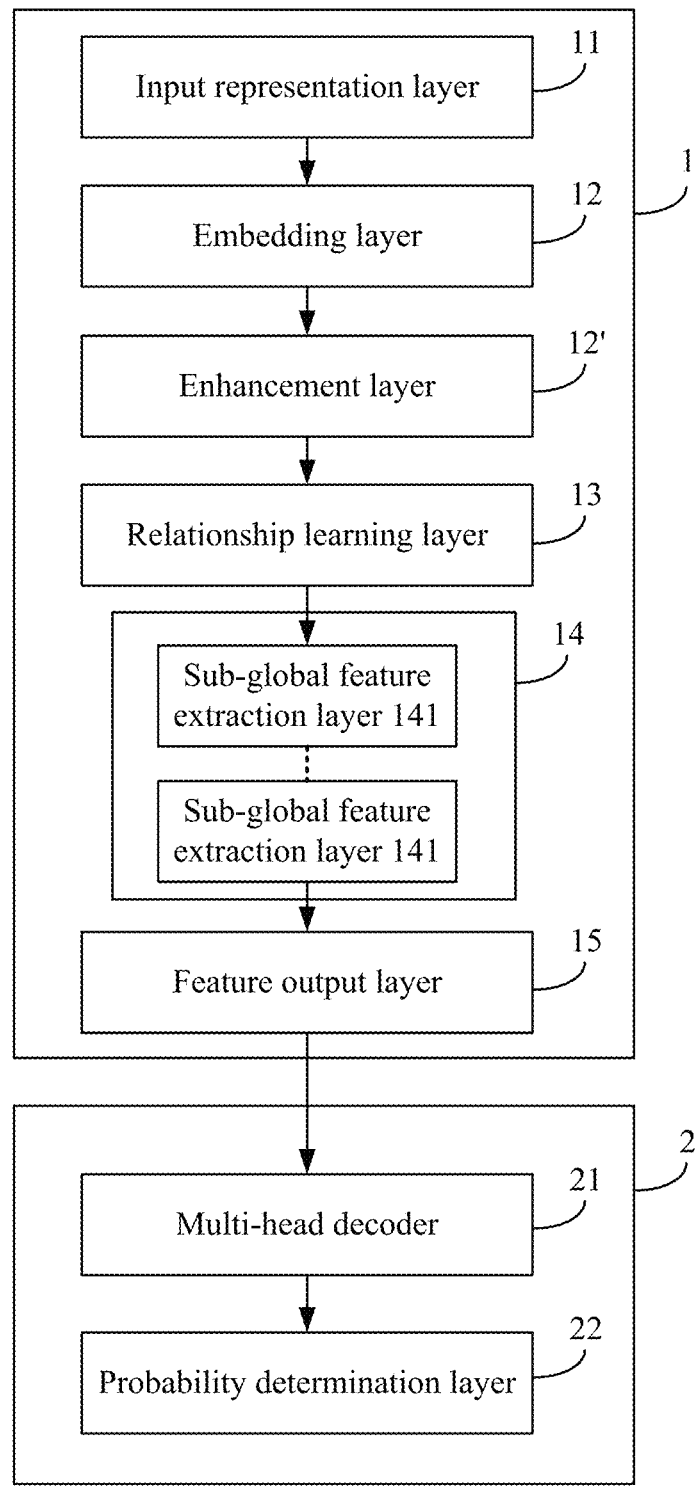
FIG. 16B is another structure diagram of a trajectory prediction neural network according to an embodiment of the present application.

In some other embodiments, based on any of the preceding embodiments, to extract more precise and effective global trajectory features and global map features, multiple global feature extraction operations may be performed, that is, multiple global feature extraction operations are performed in steps 1063a and 1063'. Correspondingly, as shown in FIG. 16A or FIG.16B, based on the neural network as shown in FIG. 3 or FIG. 15, multiple stacked sub-global feature extraction layers 141 are disposed in the global feature extraction layer 14.

The global feature extraction layer 14 performs multiple global feature extraction operations, where each global feature extraction operation includes steps described below.

After an adjacent previous sub-global feature extraction layer 141 splices a global trajectory feature extracted from the local scene feature to the high-dimensional trajectory point feature, the adjacent previous sub-global feature extraction layer 141 outputs the spliced high-dimensional trajectory point feature to a next adjacent sub-global feature extraction layer 141.

After an adjacent previous sub-global feature extraction layer 141 splices a global map feature extracted from the high-dimensional map point feature to the high-dimensional map point feature, the adjacent previous sub-global feature extraction layer 141 outputs the spliced high-dimensional map point feature to an adjacent next sub-global feature extraction layer 141.

Figure 17:
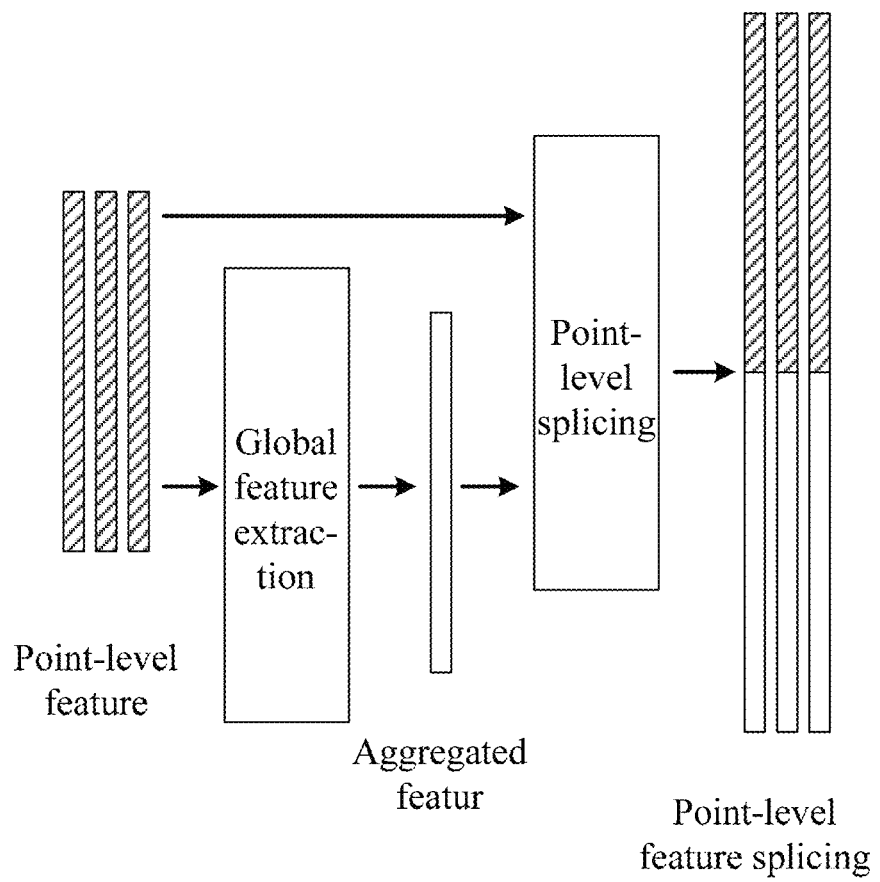
FIG. 17 is a flowchart of a global feature extraction operation according to an embodiment of the present application.

FIG. 17 shows a schematic diagram of a global feature extraction operation. Global feature extraction is performed on a point-level feature (that is, the local scene feature or the high-dimensional map point feature) so that an aggregated feature (that is, the global trajectory feature or global map feature obtained through one extraction operation) is obtained. After the extracted global feature is spliced to and input to the point-level feature extracted by the global feature extraction operation, the spliced local scene feature and the spliced high-dimensional map point feature are obtained. The spliced local scene feature and the spliced high-dimensional map point feature are input to the next sub-global feature extraction layer 141, and the next global feature extraction operation is performed.

In the case where the encoder 1 includes one global feature extraction layer 14, the global feature extraction layer 14 can extract first sequence information of an environment where a moving subject is located, that is, a global temporal and spatial feature. Multiple global feature extraction layers 14 can learn and extract second sequence information in the environment, such as the mutual influence between different objects. Through stacked global feature extraction layers 14, a deeper understanding of states of and relationship between individual objects and the global temporal and spatial environment can be achieved so that stacked feature layers can capture the interaction and influence between multiple objects.

For example, after the current car decelerates, the following car decelerates accordingly, and this effect and influence can be captured by the stacked feature layers.

The stacked global feature extraction layers 14 are disposed in the encoder 1 so that the interaction and influence between multiple objects can be extracted, the ability of the neural network to learn and understand the environment can be improved, and thus the accuracy and precision of trajectory prediction can be further improved.

Embodiments of the present application further provide a trajectory prediction device, where the device may be the structure shown in FIGS. 2A, 3, 15, 16A, or 16B. Refer to the preceding description for the corresponding network structure, and the preceding trajectory prediction processing is completed accordingly.

Figure 18:
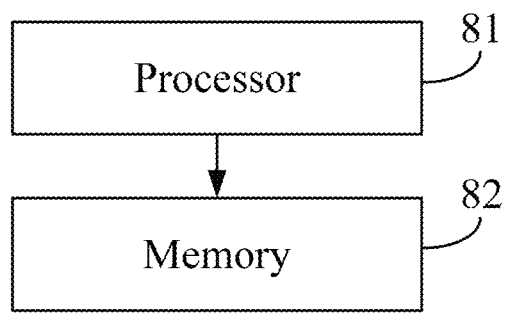
FIG. 18 is a structure diagram of a trajectory prediction device according to an embodiment of the present application.

FIG. 18 shows the structure of an exemplary trajectory prediction device. Exemplarily, the device includes a processor 81 and a memory 82. In the real-time processing, the processor 81 executes at least one machine-executable instruction stored in the memory 82 to execute the processing shown in FIGS. 11 to 14. In the training process, the processor 81 executes at least one machine-executable instruction stored in the memory 82 to execute the processing shown in FIGS. 1, 2B, 4, 6, 7A, 7B, and 10.

Embodiments of the present application further provide a computer program, where the computer program has code segments configured to perform trajectory prediction processing, where the processing includes the processing shown in FIGS. 11 to 14 and may further include the processing shown in FIGS. 1, 2B, 4, 6, 7A, 7B, and 10.

Embodiments of the present application further provide a storage medium, where the storage medium is configured to store the computer program used for trajectory prediction processing, where the processing includes the processing shown in FIGS. 11 to 14 and may further include the processing shown in FIGS. 1, 2B, 4, 6, 7A, 7B, and 10.

Some examples of the disclosure are as follows.

Example 1. A trajectory prediction method, comprises:

acquiring, by a trajectory prediction neural network, input current trajectory data and current map data of a current environment in a process of a moving subject performing movement in the current environment, wherein the current trajectory data comprises a plurality of trajectory points of the moving subject and one or more other moving objects in the current environment in a past predetermined time period, each of the plurality of trajectory points comprises a spatial position at a corresponding time point, and the current map data comprises spatial positions of a plurality of map points of a road element in the current environment in the predetermined time period;

expressing the current trajectory data and the current map data as a current trajectory point set and a current map point set in a high-dimensional space, wherein the current trajectory point set comprises high-dimensional trajectory points to which the plurality of trajectory points in the current trajectory data each correspond, and the current map point set comprises high-dimensional map points to which the plurality of map points in the current map data each correspond;

extracting a global scene feature according to the current trajectory point set and the current map point set, wherein the global scene feature has a trajectory feature and a map feature of the current environment; and predicting and outputting a plurality of prediction trajectory point sets of the moving subject and a probability corresponding to each of the plurality of prediction trajectory point sets according to the global scene feature, wherein each of the plurality of prediction trajectory point sets comprises spatial positions of the moving subject at a plurality of time points in a future predetermined time period.

Example 2. The method of example 1, wherein expressing, by the trajectory prediction neural network, the current trajectory data and the current map data as the current trajectory point set and the current map point set in the high-dimensional space comprises:

expressing the current trajectory point set in a predetermined unordered trajectory data format to obtain an unordered current trajectory point set; and expressing the current map point set in a predetermined unordered map data format to obtain an unordered current map point set.

Example 3. The method of example 1, wherein extracting, by the trajectory prediction neural network, the global scene feature according to the current trajectory point set and the current map point set comprises:

embedding the current trajectory point set into a predetermined high-dimensional space to obtain a high-dimensional trajectory point feature, and embedding the current map point set into the predetermined high-dimensional space to obtain a high-dimensional map point feature;

obtaining a local scene feature according to the current trajectory point set, the current map point set, the high-dimensional trajectory point feature, and the high-dimensional map point feature, wherein the local scene feature is a high-dimensional trajectory point feature with local map information;

performing a global feature extraction operation on the local scene feature and the high-dimensional map point feature, respectively, to obtain a global trajectory feature and a global map feature; and determining the global scene feature according to the global trajectory feature and the global map feature.

Example 4. The method of example 3, wherein the trajectory prediction neural network further performs directionality and connectivity enhancement processing on the high-dimensional trajectory point feature and the high-dimensional map point feature.

Example 5. The method of example 3, wherein obtaining the local scene feature according to the current trajectory point set, the current map point set, the high-dimensional trajectory point feature, and the high-dimensional map point feature comprises:

for each high-dimensional trajectory point, determining a plurality of relative spatial relationships between the high-dimensional trajectory point and a plurality of predetermined high-dimensional map points around the high-dimensional trajectory point according to the current trajectory point set and the current map point set;

for each high-dimensional trajectory point, embedding each map spatial relationship corresponding to the high-dimensional trajectory point into the high-dimensional space to obtain high-dimensional map spatial relationships, and dot-multiplying each high-dimensional map spatial relationship with a corresponding high-dimensional map point feature to obtain a weighted map feature;

maximizing the weighted map features of the high-dimensional trajectory points, and selecting a maximum weighted map feature; and adding the maximum weighted map feature to the high-dimensional trajectory point feature corresponding to the high-dimensional trajectory points to obtain the local scene feature.

Example 6. The method of example 5, wherein for each high-dimensional trajectory point, determining the plurality of relative spatial relationships between the high-dimensional trajectory point and the plurality of predetermined high-dimensional map points around the high-dimensional trajectory point according to the current trajectory point set and the current map point set comprises:

determining a predetermined number of high-dimensional map points, wherein a Euclidean distance between each of the high-dimensional map points and the high-dimensional trajectory point is within a preset distance threshold; and determining a relative spatial relationship between the high-dimensional trajectory point and each of the plurality of high-dimensional map points, wherein the relative spatial relationship comprises absolute positions of and a relative position between the high-dimensional trajectory point and the high-dimensional map point and a relative distance and a relative direction between the high-dimensional trajectory point and the high-dimensional map point.

Example 7. The method of example 3, wherein respectively extracting the global trajectory feature and the global map feature from the local scene feature and the high-dimensional map point feature comprises:

performing feature extraction on each feature of the local scene feature, maximizing an extracted feature, and using a selected maximum feature as the global trajectory feature; and performing feature extraction on each feature of the high-dimensional map point feature, maximizing an extracted feature, and using a selected maximum feature as the global map feature.

Example 8. The method of example 3 or 7, wherein respectively extracting, by the trajectory prediction neural network, the global trajectory feature and the global map feature from the local scene feature and the high-dimensional map point feature comprises:

performing, by the trajectory prediction neural network, a plurality of global feature extraction operations, wherein each of the plurality of global feature extraction operations comprises:

after splicing the global trajectory feature extracted from the local scene feature to the high-dimensional trajectory point feature, outputting the spliced high-dimensional trajectory point feature to a next global feature extraction operation; and after splicing the global map feature extracted from the high-dimensional map point feature to the high-dimensional map point feature, outputting the spliced high-dimensional map point feature to the next global feature extraction operation.

Example 9. The method of example 3, wherein determining the global scene feature according to the global trajectory feature and the global map feature comprises:

adding the global trajectory feature to the global map feature to obtain the global scene feature.

Example 10. The method of example 1, wherein the current trajectory data further comprises velocities of the moving subject and the one or more other moving objects at each of the plurality of trajectory points.

Example 11. The method of example 1, wherein the current trajectory data further comprises:

attribute data of the moving subject and each of the one or more other moving objects, wherein the attribute data comprises object category data of the moving subject and each of the one or more other moving objects.

Example 12. The method of example 11, wherein in a case where the moving subject or each of the one or more other moving objects is a vehicle, the attribute data further comprises one or more of the following: headlight attribute data or taillight attribute data.

Example 13. The method of example 1, wherein the current map data further comprises position differences between each of the plurality of map points and adjacent map points on a same road element as the map point.

Example 14. The method of example 13, wherein the current map data further comprises attribute data of each of the plurality of map points, wherein the attribute data comprises a category of a road element to which the map point belongs and a sequence number of the map point within a plurality of map points comprised in the predetermined time period in the road element to which the map point belongs.

Example 15. The method of example 1, wherein acquiring, by the trajectory prediction neural network, the input current trajectory data and the current map data comprises:

acquiring the input current trajectory data and the current map data from an upstream module.

Example 16. The method of example 1, wherein a process of performing training to obtain the trajectory prediction neural network comprises:

in a training stage, perform a plurality of times of iteration training on a preset neural network according to historical first trajectory data, historical second trajectory data, and historical map data, wherein the first trajectory data and the second trajectory data are data sets that are adjacent to each other in time, and each of the first trajectory data and the second trajectory data comprises a plurality of trajectory points of a moving subject and one or more surrounding moving objects in a predetermined time period, and each of the plurality of trajectory points comprises a spatial position at a corresponding time point; the historical map data comprises spatial positions of a plurality of map points of road elements in an environment where the moving subject is located in a time period corresponding to the first trajectory data; the preset neural network has an initial parameter set;

each of the plurality of times of iteration training comprises:

inputting the first trajectory data and the historical map data to the neural network; expressing, by the neural network, the first trajectory data and the historical map data as a first trajectory point set and a historical map point set in the high-dimensional space; and extracting a global scene feature according to the first trajectory point set and the historical map point set, wherein the global scene feature has a trajectory feature and a map feature of an environment where the moving subject is located; and predicting and outputting a plurality of trajectory point sets of the moving subject and a probability of each of the plurality of trajectory point sets according to the global scene feature, wherein the each of the plurality of trajectory point sets comprises spatial positions of the moving subject at a plurality of time points in a future predetermined time period; and inputting each of the plurality of output trajectory point sets, the probability of each of the plurality of output trajectory point sets, and the second trajectory data as input to a corresponding loss function to obtain output of the loss function; determining whether output of all loss functions satisfies a preset convergence condition; in response to determining that the convergence condition is satisfied, determining that the training is completed and acquiring a parameter set of a trained neural network; and in response to determining that the convergence condition is not satisfied, adjusting parameters of the neural network and performing a next one time of the plurality of times of iteration training.

Example 17. A trajectory prediction device, comprising an encoder and a decoder, wherein the encoder is configured to acquire input current trajectory data and current map data of a current environment in a process of a moving subject performing movement in the current environment, wherein the current trajectory data comprises a plurality of trajectory points of the moving subject and one or more other moving objects in the current environment in a past predetermined time period, each of the plurality of trajectory points comprises a spatial position at a corresponding time point, and the current map data comprises spatial positions of a plurality of map points of road elements in the current environment in the predetermined time period;

the encoder is configured to express the current trajectory data and the current map data as a current trajectory point set and a current map point set in a high-dimensional space;

the encoder is further configured to extract a global scene feature according to the current trajectory point set and the current map point set, wherein the global scene feature has a trajectory feature and a map feature of the current environment; and the decoder is configured to predict and output a plurality of prediction trajectory point sets of the moving subject and a probability corresponding to each of the plurality of prediction trajectory point sets according to the global scene feature, wherein each of the plurality of prediction trajectory point sets comprises spatial positions of the moving subject at a plurality of time points in a future predetermined time period.

Example 18. The device of example 17, wherein the decoder comprises an input representation layer;

wherein the decoder is configured to express the current trajectory data and the current map data as the current trajectory point set and the current map point set in the high-dimensional space in the following manner:

the input representation layer is configured to express the current trajectory point set in a predetermined unordered trajectory data format to obtain an unordered high-dimensional current trajectory point set; and express the current map point set in a predetermined unordered map data format to obtain an unordered current map point set.

Example 19. The device of example 17, wherein the encoder comprises an embedding layer, a map relationship learning layer, a global feature extraction layer, and a feature output layer, wherein the encoder is configured to extract the global scene feature according to the current trajectory point set and the current map point set in the following manner:

the embedding layer is configured to embed the current trajectory point set into a predetermined high-dimensional space so that a high-dimensional trajectory point feature is obtained, and embed the current map point set into the predetermined high-dimensional space so that a high-dimensional map point feature is obtained;

the map relationship learning layer is configured to obtain a local scene feature according to the current trajectory point set, the current map point set, the high-dimensional trajectory point feature, and the high-dimensional map point feature, wherein the local scene feature is a high-dimensional trajectory point feature with local map information;

the global feature extraction layer is configured to perform a global feature extraction operation on the local scene feature and the high-dimensional map point feature to extract a global trajectory feature and a global map feature; and the feature output layer is configured to determine the global scene feature according to the global trajectory feature and the global map feature.

Example 20. The device of example 19, wherein the decoder further comprises an enhancement layer, wherein the enhancement layer is configured to perform directionality and connectivity enhancement processing on the high-dimensional trajectory point feature and the high-dimensional map point feature, and the enhancement layer comprises a self-attention neural network.

Example 21. The device of example 19, wherein the map relationship learning layer is configured to obtain the local scene feature according to the current trajectory point set, the current map point set, the high-dimensional trajectory point feature, and the high-dimensional map point feature in the following manner:

determining a plurality of relative spatial relationships between each high-dimensional trajectory point and a plurality of predetermined high-dimensional map points around the each high-dimensional trajectory point according to the current trajectory point set and the current map point set;

embedding each map spatial relationship corresponding to a high-dimensional trajectory point into the high-dimensional space to obtain a high-dimensional map spatial relationship, and dot-multiplying each high-dimensional map spatial relationship with a corresponding high-dimensional map point feature to obtain a weighted map feature; and maximizing a plurality of weighted map features of the high-dimensional trajectory point, and selecting a maximum weighted map feature; and adding the maximum weighted map feature to the high-dimensional trajectory point feature corresponding to the high-dimensional trajectory point to obtain a local scene feature.

Example 22. The device of example 21, wherein the map relationship learning layer is configured to determine the plurality of relative spatial relationships between the each high-dimensional trajectory point and the plurality of predetermined high-dimensional map points around the each high-dimensional trajectory point according to the current trajectory point set and the current map point set in the following manner:

determining a predetermined number of a plurality of high-dimensional map points, wherein a Euclidean distance between each of the high-dimensional map points and a high-dimensional trajectory point is within a preset distance threshold; and determining a relative spatial relationship between the high-dimensional trajectory point and each of the plurality of high-dimensional map points, wherein the relative spatial relationship comprises absolute positions of and a relative position between the high-dimensional trajectory point and a high-dimensional map point and a relative distance and a relative direction between the high-dimensional trajectory point and the high-dimensional map point.

Example 23. The device of example 19, wherein the global feature extraction layer is configured to respectively extract the global trajectory feature and the global map feature from the local scene feature and the high-dimensional map point feature in the following manner:

performing feature extraction on each feature of the local scene feature, maximizing an extracted feature, and using a selected maximum feature as the global trajectory feature; and performing feature extraction on each feature of the high-dimensional map point feature, maximizing an extracted feature, and using a selected maximum feature as the global map feature.

Example 24. The device of example 19 or 23, wherein the global feature extraction layer comprises a plurality of stacked sub-global feature extraction layers, wherein after an adjacent previous sub-global feature extraction layer splices a global trajectory feature extracted from the local scene feature to the high-dimensional trajectory point feature, the adjacent previous sub-global feature extraction layer is configured to output the spliced high-dimensional trajectory point feature to an adjacent next sub-global feature extraction layer; and after an adjacent previous sub-global feature extraction layer splices a global map feature extracted from the high-dimensional map point feature to the high-dimensional map point feature, the adjacent previous sub-global feature extraction layer is configured to output the spliced high-dimensional map point feature to an adjacent next sub-global feature extraction layer.

Example 25. The device of example 19, wherein the feature output layer is configured to determine the global scene feature according to the global trajectory feature and the global map feature in the following manner:

the feature output layer is configured to add the global trajectory feature to the global map feature to obtain the global scene feature.

Example 26. The device of example 17, wherein the decoder comprises a multi-head decoder and a probability determination layer, wherein the multi-head decoder is configured to predict and output the plurality of prediction trajectory point sets of the moving subject according to the global scene feature; and the multi-head decoder comprises a plurality of recurrent neural networks or a multilayer perceptron, and each of the plurality of recurrent neural networks comprises a long-short term memory network or a gated recurrent unit; and the probability determination layer is configured to determine the probability corresponding to each of the plurality of prediction trajectory point sets.

Example 27. A trajectory prediction device, comprising a processor and at least one memory, wherein at least one machine-executable instruction is stored in the at least one memory, and the processor executes the at least one machine-executable instruction to implement the method of any one of examples 1 to 16.

Example 28. A computer program, wherein the computer program has code segments configured to perform a trajectory prediction processing, and the processing comprises the method of any one of examples 1 to 16.

Example 29. A non-transitory storage medium, configured to store at least one machine-executable instruction, wherein a processor executes the at least one machine-executable instruction to implement the method of any one of examples 1 to 16.

It is apparent to those skilled in the art that various modifications and variations can be made in the present application without departing from the spirit and scope of the present application. In this case, if such modifications and variations of the present application are within the claims of the present application and equivalent technologies thereof, the present application is intended to include such modifications and variations.

What is claimed is:

1. A trajectory prediction method, comprising:
   acquiring current trajectory data and current map data, wherein the current trajectory data comprises a plurality of trajectory points of a moving subject performing movement in current environment and one or more other moving objects in the current environment in a past predetermined time period, each of the plurality of trajectory points comprises a spatial position at a corresponding time point, and the current map data comprises spatial positions of a plurality of map points of a road element in the current environment in the predetermined time period;
   expressing the current trajectory data and the current map data as a current trajectory point set and a current map point set in a high-dimensional space;
   extracting a global scene feature according to the current trajectory point set and the current map point set;
   predicting a plurality of prediction trajectory point sets of the moving subject and a probability corresponding to each of the plurality of prediction trajectory point sets according to the global scene feature; and
   controlling a vehicle to travel along a path planned according to the plurality of prediction trajectory point sets and the probability corresponding to each of the plurality of prediction trajectory point sets.

2. The method of claim 1, wherein expressing the current trajectory data and the current map data as the current trajectory point set and the current map point set in the high-dimensional space comprises:
   expressing the current trajectory point set in a predetermined unordered trajectory data format to obtain an unordered current trajectory point set; and
   expressing the current map point set in a predetermined unordered map data format to obtain an unordered current map point set.

3. The method of claim 1, wherein the current trajectory point set comprises high-dimensional trajectory points to which the plurality of trajectory points in the current trajectory data each correspond, and the current map point set comprises high-dimensional map points to which the plurality of map points in the current map data each correspond.

4. The method of claim 3, wherein extracting the global scene feature according to the current trajectory point set and the current map point set comprises:
   embedding the current trajectory point set into a predetermined high-dimensional space to obtain a high-dimensional trajectory point feature, and embedding the current map point set into the predetermined high-dimensional space to obtain a high-dimensional map point feature;
   obtaining a local scene feature according to the current trajectory point set, the current map point set, the high-dimensional trajectory point feature, and the high-dimensional map point feature;
   performing a global feature extraction operation on the local scene feature and the high-dimensional map point feature, respectively, to obtain a global trajectory feature and a global map feature; and
   determining the global scene feature according to the global trajectory feature and the global map feature.

5. The method of claim 4, wherein obtaining the local scene feature according to the current trajectory point set, the current map point set, the high-dimensional trajectory point feature, and the high-dimensional map point feature comprises:
   for each high-dimensional trajectory point, determining a plurality of relative spatial relationships between the high-dimensional trajectory point and a plurality of predetermined high-dimensional map points around the high-dimensional trajectory point according to the current trajectory point set and the current map point set;
   for each high-dimensional trajectory point, embedding each relative spatial relationship corresponding to the high-dimensional trajectory point into the high-dimensional space to obtain high-dimensional map spatial relationships, and dot-multiplying each high-dimensional map spatial relationship with a corresponding high-dimensional map point feature to obtain a weighted map feature;
   maximizing the weighted map features of the high-dimensional trajectory points, and selecting a maximum weighted map feature; and
   adding the maximum weighted map feature to the high-dimensional trajectory point feature corresponding to the high-dimensional trajectory points to obtain the local scene feature.

6. The method of claim 5, wherein for each high-dimensional trajectory point, determining the plurality of relative spatial relationships between the high-dimensional trajectory point and the plurality of predetermined high-dimensional map points around the high-dimensional trajectory point according to the current trajectory point set and the current map point set comprises:
   determining a predetermined number of high-dimensional map points, wherein a Euclidean distance between each of the high-dimensional map points and the high-dimensional trajectory point is within a preset distance threshold; and
   determining a relative spatial relationship between the high-dimensional trajectory point and each of the plurality of high-dimensional map points, wherein the relative spatial relationship comprises absolute positions of and a relative position between the high-dimensional trajectory point and the high-dimensional map point and a relative distance and a relative direction between the high-dimensional trajectory point and the high-dimensional map point.

7. The method of claim 4, wherein performing the global feature extraction operation on the local scene feature and the high-dimensional map point feature, respectively, to obtain the global trajectory feature and the global map feature comprises:
performing a plurality of global feature extraction operations, wherein each of the plurality of global feature extraction operations comprises:
after splicing the global trajectory feature extracted from the local scene feature to the high-dimensional trajectory point feature, outputting the spliced high-dimensional trajectory point feature to a next global feature extraction operation; and
after splicing the global map feature extracted from the high-dimensional map point feature to the high-dimensional map point feature, outputting the spliced high-dimensional map point feature to the next global feature extraction operation.

8. The method of claim 1, wherein the current trajectory data further comprises:
velocities of the moving subject and the one or more other moving objects at each of the plurality of trajectory points; or
attribute data of the moving subject and each of the one or more other moving objects, wherein the attribute data comprises object category data of the moving subject and each of the one or more other moving objects.

9. The method of claim 1, wherein the current map data further comprises:
position differences between each of the plurality of map points and adjacent map points on a same road element as the map point; or
attribute data of each of the plurality of map points, wherein the attribute data comprises a category of a road element to which the map point belongs and a sequence number of the map point within a plurality of map points comprised in the predetermined time period in the road element to which the map point belongs.

10. The method of claim 1, wherein the method is performed by a prediction neural network, and the method further comprises performing training to obtain the trajectory prediction neural network, wherein performing training to obtain the trajectory prediction neural network comprises:
performing a plurality of times of iteration training on a preset neural network according to historical first trajectory data, historical second trajectory data, and historical map data, wherein the first trajectory data and the second trajectory data are data sets that are adjacent to each other in time, and each of the first trajectory data and the second trajectory data comprises a plurality of trajectory points of a moving subject and one or more surrounding moving objects in a predetermined time period, and each of the plurality of trajectory points comprises a spatial position at a corresponding time point; the historical map data comprises spatial positions of a plurality of map points of road elements in an environment where the moving subject is located in a time period corresponding to the first trajectory data; the preset neural network has an initial parameter set.

11. The method of claim 10, wherein each of the plurality of times of iteration training comprises:
inputting the first trajectory data and the historical map data to the neural network;
expressing, by the neural network, the first trajectory data and the historical map data as a first trajectory point set and a historical map point set in the high-dimensional space; and extracting a global scene feature according to the first trajectory point set and the historical map point set, wherein the global scene feature has a trajectory feature and a map feature of an environment where the moving subject is located; and predicting and outputting a plurality of trajectory point sets of the moving subject and a probability of each of the plurality of trajectory point sets according to the global scene feature, wherein the each of the plurality of trajectory point sets comprises spatial positions of the moving subject at a plurality of time points in a future predetermined time period; and
inputting each of the plurality of output trajectory point sets, the probability of each of the plurality of output trajectory point sets, and the second trajectory data as input to a corresponding loss function to obtain output of the loss function; determining whether output of all loss functions satisfies a preset convergence condition; in response to determining that the convergence condition is satisfied, determining that the training is completed and acquiring a parameter set of a trained neural network; and in response to determining that the convergence condition is not satisfied, adjusting parameters of the neural network and performing a next one time of the plurality of times of iteration training.

12. The method of claim 1, wherein acquiring the current trajectory data and the current map data of the current environment comprising the current map data comprises acquiring, by a trajectory prediction neural network, the current trajectory data that is input and the current map data of the current environment that are input in a process of the moving subject performing movement in the current environment;
wherein the global scene feature has a trajectory feature and a map feature of the current environment; or
wherein each of the plurality of prediction trajectory point sets comprises spatial positions of the moving subject at a plurality of time points in a future predetermined time period.

13. A trajectory prediction device, comprising at least one processor and at least one memory, wherein at least one machine-executable instruction is stored in the at least one memory, and the processor executes the at least one machine-executable instruction to implement operations comprising:
acquiring current trajectory data and current map data, wherein the current trajectory data comprises a plurality of trajectory points of a moving subject performing movement in current environment and one or more other moving objects in the current environment in a past predetermined time period, each of the plurality of trajectory points comprises a spatial position at a corresponding time point, and the current map data comprises spatial positions of a plurality of map points of a road element in the current environment in the predetermined time period;
expressing the current trajectory data and the current map data as a current trajectory point set and a current map point set in a high-dimensional space;

extracting a global scene feature according to the current trajectory point set and the current map point set;

predicting a plurality of prediction trajectory point sets of the moving subject and a probability corresponding to each of the plurality of prediction trajectory point sets according to the global scene feature; and controlling a vehicle to travel along a path planned according to the plurality of prediction trajectory point sets and the probability corresponding to each of the plurality of prediction trajectory point sets.

14. The device of claim 13, wherein expressing, by a trajectory prediction neural network, the current trajectory data and the current map data as the current trajectory point set and the current map point set in the high-dimensional space comprises:

expressing the current trajectory point set in a predetermined unordered trajectory data format to obtain an unordered current trajectory point set; and expressing the current map point set in a predetermined unordered map data format to obtain an unordered current map point set.

15. The device of claim 13, wherein the current trajectory point set comprises high-dimensional trajectory points to which the plurality of trajectory points in the current trajectory data each correspond, and the current map point set comprises high-dimensional map points to which the plurality of map points in the current map data each correspond, wherein extracting the global scene feature according to the current trajectory point set and the current map point set comprises:

embedding the current trajectory point set into a predetermined high-dimensional space to obtain a high-dimensional trajectory point feature, and embedding the current map point set into the predetermined high-dimensional space to obtain a high-dimensional map point feature;

obtaining a local scene feature according to the current trajectory point set, the current map point set, the high-dimensional trajectory point feature, and the high-dimensional map point feature;

performing a global feature extraction operation on the local scene feature and the high-dimensional map point feature, respectively, to obtain a global trajectory feature and a global map feature; and determining the global scene feature according to the global trajectory feature and the global map feature.

16. A non-transitory storage medium, configured to store at least one machine-executable instruction, wherein a processor executes the at least one machine-executable instruction to implement operations comprising:

acquiring current trajectory data and current map data, wherein the current trajectory data comprises a plurality of trajectory points of a moving subject performing movement in current environment and one or more other moving objects in the current environment in a past predetermined time period, each of the plurality of trajectory points comprises a spatial position at a corresponding time point, and the current map data comprises spatial positions of a plurality of map points of a road element in the current environment in the predetermined time period;

expressing the current trajectory data and the current map data as a current trajectory point set and a current map point set in a high-dimensional space;

extracting a global scene feature according to the current trajectory point set and the current map point set;

predicting a plurality of prediction trajectory point sets of the moving subject and a probability corresponding to each of the plurality of prediction trajectory point sets according to the global scene feature; and controlling a vehicle to travel along a path planned according to the plurality of prediction trajectory point sets and the probability corresponding to each of the plurality of prediction trajectory point sets.

17. The non-transitory storage medium of claim 16, wherein expressing, by a trajectory prediction neural network, the current trajectory data and the current map data as the current trajectory point set and the current map point set in the high-dimensional space comprises:

expressing the current trajectory point set in a predetermined unordered trajectory data format to obtain an unordered current trajectory point set; and expressing the current map point set in a predetermined unordered map data format to obtain an unordered current map point set.

18. The non-transitory storage medium of claim 16, wherein the current trajectory point set comprises high-dimensional trajectory points to which the plurality of trajectory points in the current trajectory data each correspond, and the current map point set comprises high-dimensional map points to which the plurality of map points in the current map data each correspond, wherein extracting the global scene feature according to the current trajectory point set and the current map point set comprises:

embedding the current trajectory point set into a predetermined high-dimensional space to obtain a high-dimensional trajectory point feature, and embedding the current map point set into the predetermined high-dimensional space to obtain a high-dimensional map point feature;

obtaining a local scene feature according to the current trajectory point set, the current map point set, the high-dimensional trajectory point feature, and the high-dimensional map point feature;

performing a global feature extraction operation on the local scene feature and the high-dimensional map point feature, respectively, to obtain a global trajectory feature and a global map feature; and determining the global scene feature according to the global trajectory feature and the global map feature.

* * * * *